(12) United States Patent
N et al.

(10) Patent No.: US 12,547,492 B2
(45) Date of Patent: Feb. 10, 2026

(54) NONVOLATILE MEMORY WITH DISTRIBUTED XOR PROTECTION

(71) Applicant: Sandisk Technologies, Inc., Milpitas, CA (US)

(72) Inventors: Mohith Kumar N, Bangalore (IN); Sri Harsha Chintamaneni, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 112 days.

(21) Appl. No.: 18/506,155

(22) Filed: Nov. 10, 2023

(65) Prior Publication Data

US 2025/0156268 A1 May 15, 2025

(51) Int. Cl.
*G06F 11/00* (2006.01)
*G06F 11/08* (2006.01)

(52) U.S. Cl.
CPC .................................. *G06F 11/085* (2013.01)

(58) Field of Classification Search
CPC ............... G06F 11/085; G06F 11/0727; G06F 11/1044; G06F 11/1004; G06F 11/1048; G06F 11/1068; G06F 11/1072
See application file for complete search history.

(56) References Cited

U.S. PATENT DOCUMENTS

| | | |
|---|---|---|
| 9,830,093 B2 | 11/2017 | Guo et al. |
| 9,996,285 B2 | 6/2018 | Kang et al. |
| 11,170,869 B1 * | 11/2021 | Helmick ............ H03M 13/1145 |
| 11,321,173 B2 | 5/2022 | Luo et al. |
| 11,500,569 B2 | 11/2022 | Markus et al. |
| 11,500,719 B1 * | 11/2022 | Srinivasan .......... G06F 11/1048 |
| 11,520,491 B2 | 12/2022 | Luo et al. |
| 11,521,690 B2 | 12/2022 | Manganelli et al. |
| 2017/0091022 A1 * | 3/2017 | Khan ................... G06F 11/1068 |
| 2021/0335432 A1 * | 10/2021 | Manganelli ......... G06F 11/1048 |
| 2022/0083261 A1 * | 3/2022 | Fujiwara ............. G06F 11/1012 |
| 2022/0342752 A1 * | 10/2022 | Ionin ................... G06F 11/1048 |
| 2024/0419554 A1 * | 12/2024 | Thalaimalai Vanaraj ................... G06F 11/1451 |

\* cited by examiner

*Primary Examiner* — Joseph D Manoskey
(74) *Attorney, Agent, or Firm* — Pearl Cohen Zedek Latzer Baratz LLP

(57) ABSTRACT

An apparatus includes control circuits that are configured to connect to a plurality of nonvolatile memory cells. The control circuits are configured to determine that a first portion of user data from the plurality of memory cells that was found to be uncorrectable by ECC is unrecoverable by a first Exclusive OR (XOR) operation using first XOR data and a second portion of user data. The control circuits are further configured to, in response to the determination, recover the first portion of user data by a second XOR operation using second XOR data and a third portion of user data.

19 Claims, 22 Drawing Sheets

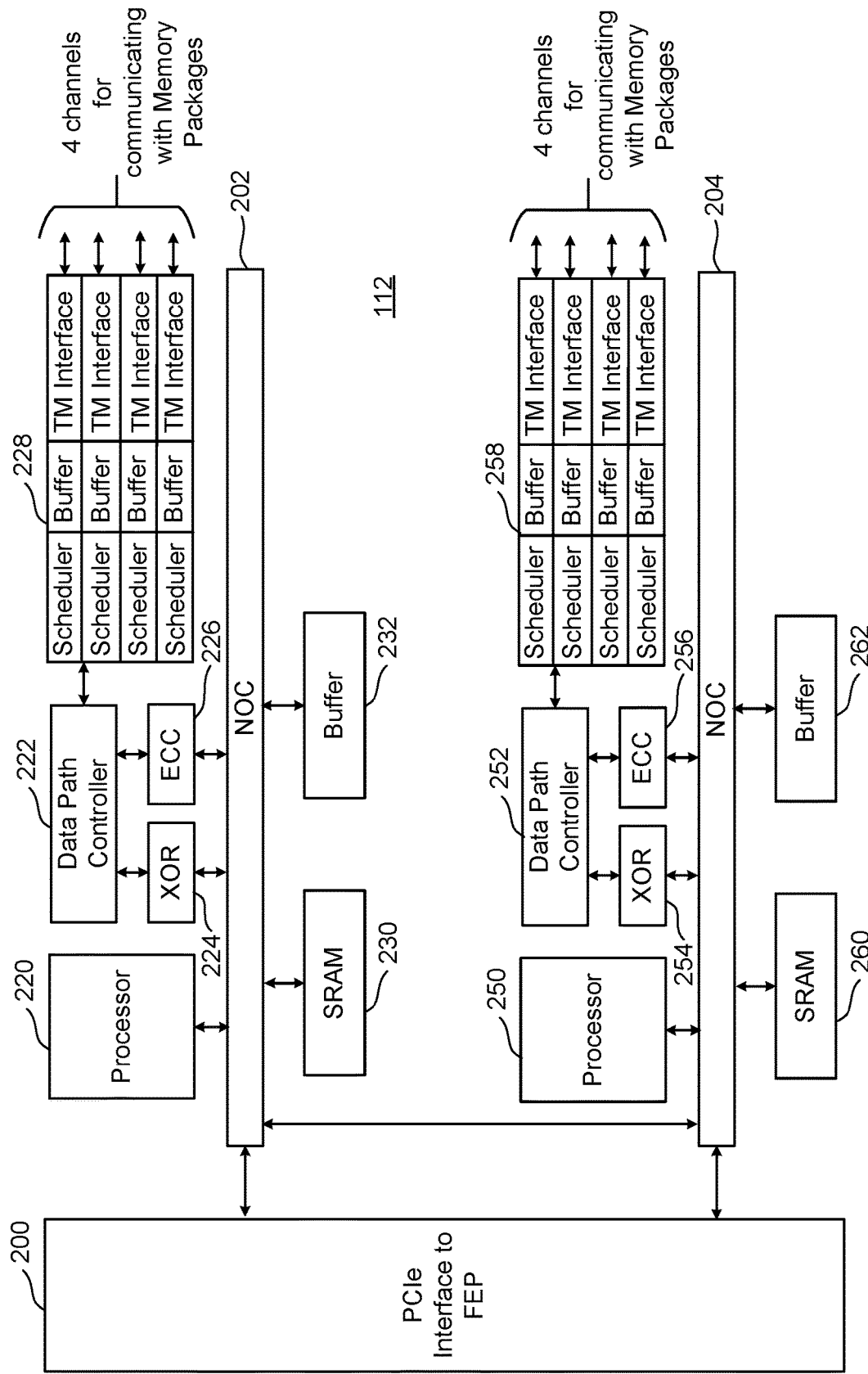

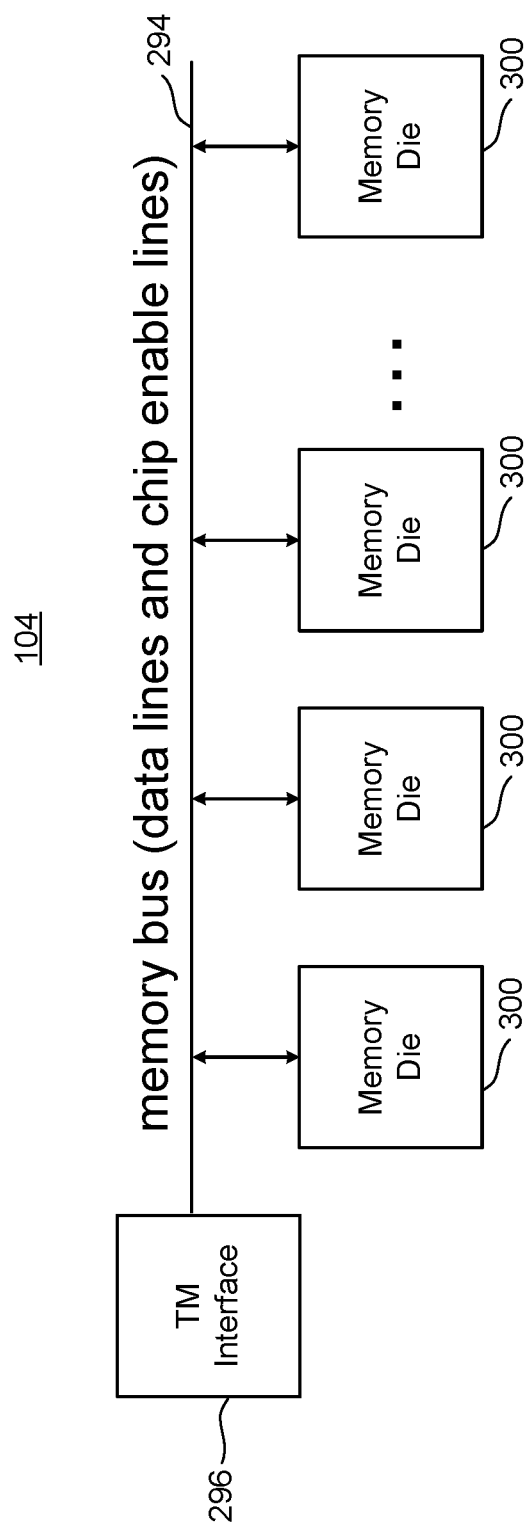

| XOR Metablock | | | Die0 | | | | Die1 | | | | Die2 | | | | Die3 | | | | | | | | | | | | | |
|---|---|---|---|---|---|---|---|---|---|---|---|---|---|---|---|---|---|---|---|---|---|---|---|---|---|---|---|---|
| WL | Str | MP | P0 | P1 | P2 | P3 | P0 | P1 | P2 | P3 | P0 | P1 | P2 | P3 | P0 | P1 | P2 | P3 | | | | | | | | | | |
| | | | | | | | FIM 0 | | | | | | | | FIM 1 | | | | | | | | | | | | | |
| 0 | 0 | 0 | 0 | 1 | 2 | 3 | 4 | 5 | 6 | 7 | 8 | 9 | 10 | 11 | 12 | 13 | 14 | 15 | | | | | | | | | | |
| | 1 | 1 | 16 | 17 | 18 | 19 | 20 | 21 | 22 | 23 | 24 | 25 | 26 | 27 | 28 | 29 | 30 | 31 | | | | | | | | | | |
| | 2 | 2 | 32 | 33 | 34 | 35 | 36 | 37 | | | | | | | | | | | | | | | | | | | | |
| | 3 | 3 | | | | | | | | | | | | | | | | | | | | | | | | | | |
| | 4 | 4 | | | | | | | | | | | | | | | | | | | | | | | | | | |
| 1 | 0 | 5 | | | | | | | | | | | | | | | | | | | | | | | | | | |
| | 1 | 6 | | | | | | | | | | | | | | | | | | | | | | | | | | |
| | 2 | 7 | | | | | | | | | | | | | | | | | | | | | | | | | | |
| | 3 | 8 | | | | | | | | | | | | | | | | | | | | | | | | | | |
| | 4 | 9 | | | | | | | | | | | | | | | | | | | | | | | | | | |
| | 0 | 10 | | | | | | | | | | | | | | | | | | | | | | | | | | |
| | 1 | 11 | | | | | | | | | | | | | | | | | | | | | | | | | | |

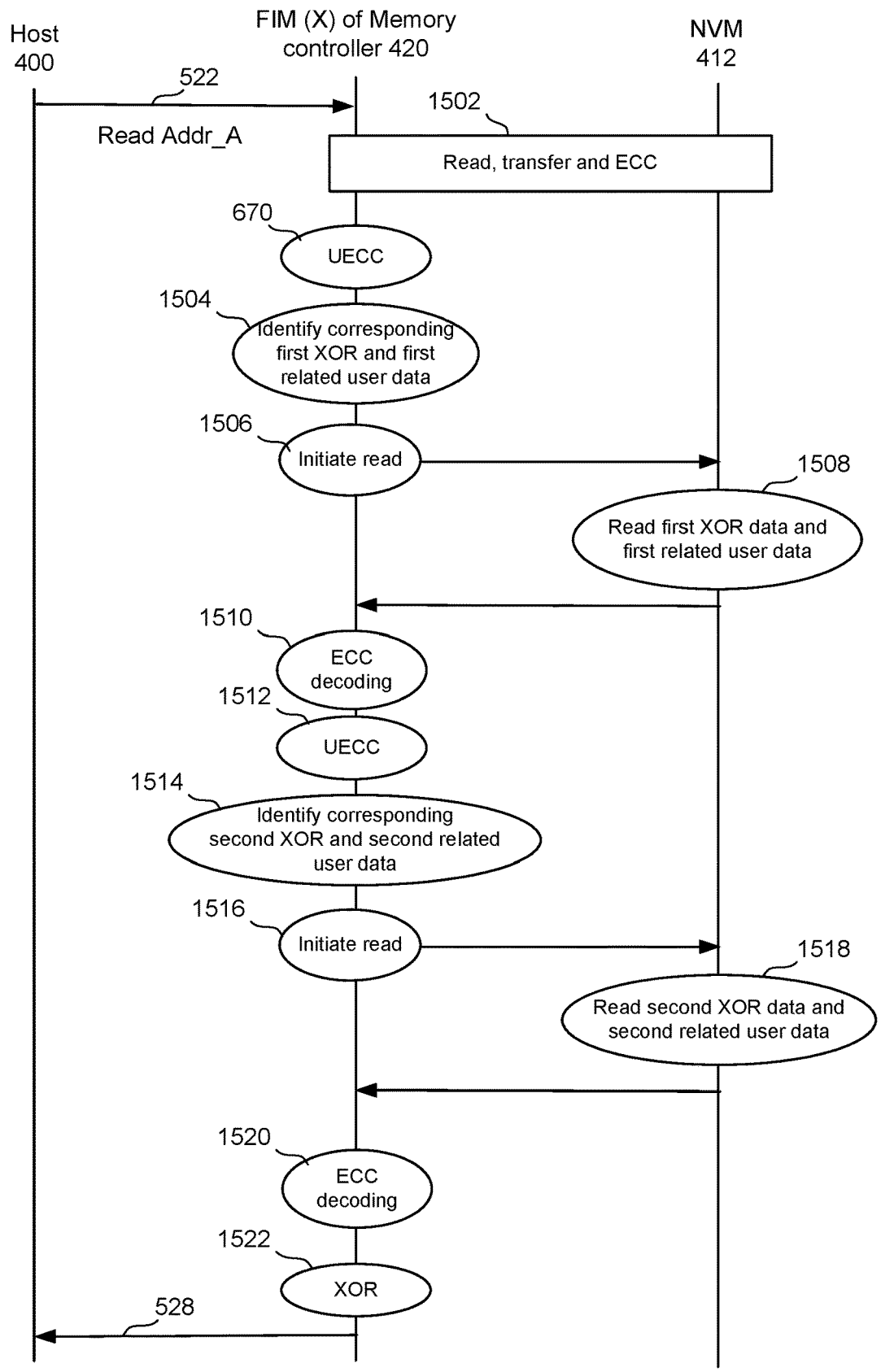

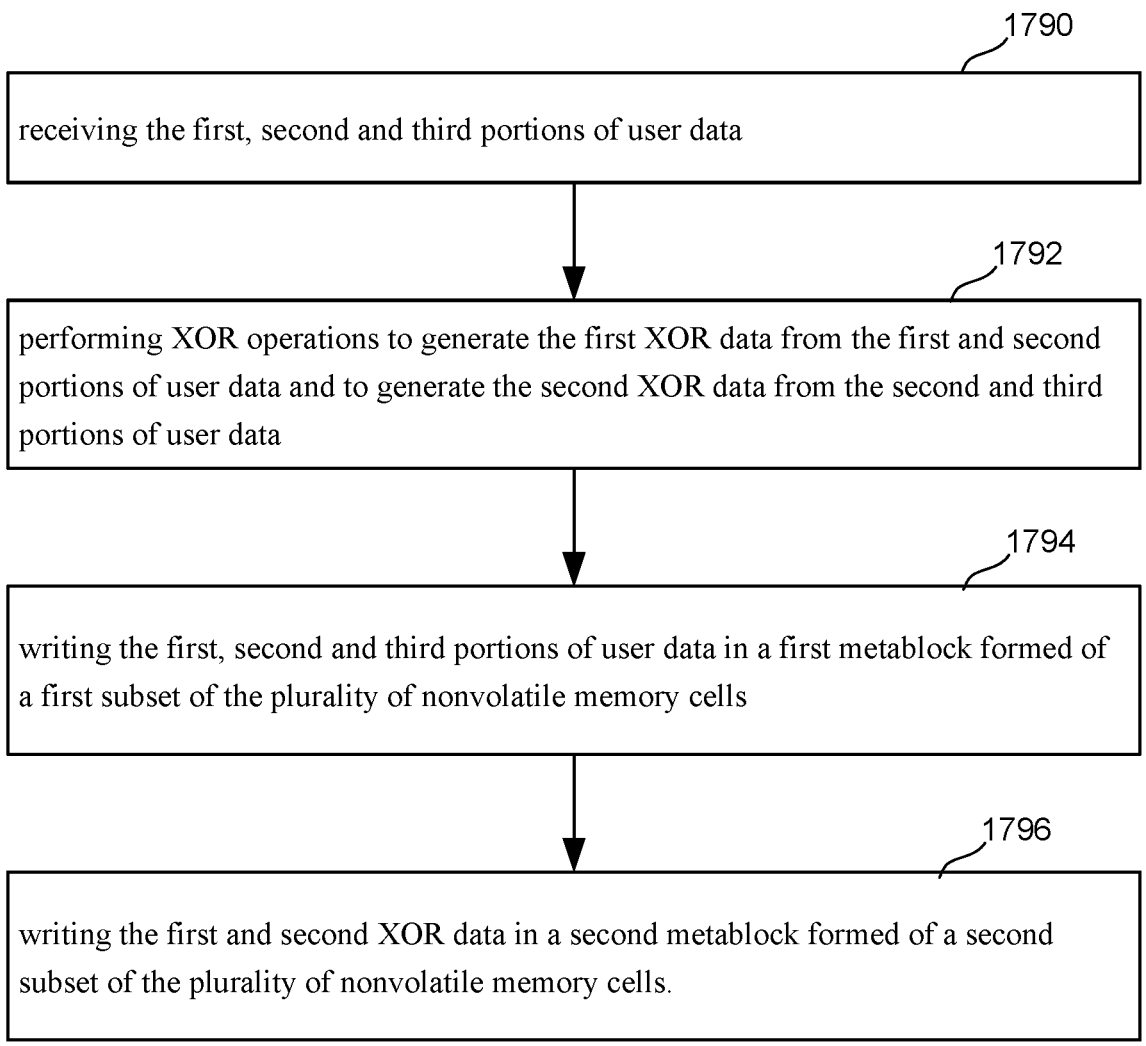

NONVOLATILE MEMORY WITH DISTRIBUTED XOR PROTECTION

BACKGROUND

The present technology relates to nonvolatile memories and to protecting data that is stored in such memories.

Semiconductor memory devices have become more popular for use in various electronic devices. For example, non-volatile semiconductor memory is used in cellular telephones, digital cameras, personal digital assistants, mobile computing devices, non-mobile computing devices and other devices (host devices).

A memory device includes memory cells, which may be arranged in series, in NAND strings, for instance, where select gate transistors are provided at the ends of the NAND string to selectively connect a channel of the NAND string to a source line or bit line.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

Data that is read from memory devices may have high error rates (e.g., because of physical defects in a memory structure). Errors (bad bits) may be corrected by Error Correction Code (ECC) up to a limit, beyond which the data may be uncorrectable by ECC (UECC). Such data may be recovered by other methods including Exclusive OR (XOR) operations. Recovery using XOR operations may be limited (e.g., may not be capable of recovering data when there are multiple portions of data that are UECC) and may be time-consuming.

BRIEF DESCRIPTION OF THE DRAWINGS

Like-numbered elements refer to common components in the different Figures.

FIG. 1C is a block diagram of one embodiment of a Back End Processor Circuit. In some embodiments, the Back End Processor Circuit is part of a Controller.

FIG. 1D is a block diagram of one embodiment of a memory package.

FIGS. 8A-B show an example of an XOR scheme in a nonvolatile memory.

FIGS. 13A-B illustrate an example of an XOR scheme on a nonvolatile memory.

FIGS. 15A-B illustrate examples of data recovery when at least one of a portion of XOR data or a related portion of user data is UECC.

FIG. 17 illustrates a method that includes generating XOR data and writing the XOR data in nonvolatile memory.

DETAILED DESCRIPTION

Techniques are disclosed herein to enable a memory system to perform data recovery effectively using Exclusive OR (XOR) operations (e.g., when the memory system encounters data that is UECC). In examples described below, a portion of user data to be stored in nonvolatile memory cells is subject to XOR operations with two or more other portions of user data to generate two or more portions of XOR data. As a result, if the portion of user data is later found to be UECC it can be recovered by XOR in at least two ways using two different portions of XOR data and two different additional portions of user data. In this way, if XOR recovery is not possible in one way (e.g., because a portion of XOR data and/or additional user data is also UECC) then the portion of data may still be recovered in another way (using the other portion of XOR data and/or additional user data).

In memory system that includes multiple planes of nonvolatile memory cells (e.g., planes of two or more memory dies) connected to a Flash Interface Module (FIM) of a memory controller, portions of data may be stored in all planes of the FIM in parallel (e.g., as part of a metapage write operation). Each such portion may be XORed with at least two other portions of the same FIM (e.g., in a four-plane arrangement, each portion may be XORed with two other portions to give a total of four portions of XOR data per FIM). The XOR data may be stored in a dedicated XOR metablock. With XOR operations limited to portions of data of a FIM and storage of the resulting XOR data in nonvolatile memory connected to the FIM, XOR data recovery can be performed rapidly by control circuits of the FIM (e.g., without requiring data from other FIMs, which could cause significant delay).

Aspects of the present technology are directed to accurate recovery of data from nonvolatile memory that may have a high error rate (e.g., where multiple portions of data may be UECC) and provide solutions to technical problems associated with reliably recovering data from nonvolatile memory (e.g., nonvolatile memory that may read data with a high error rate because of defects or otherwise).

Figure 1A:
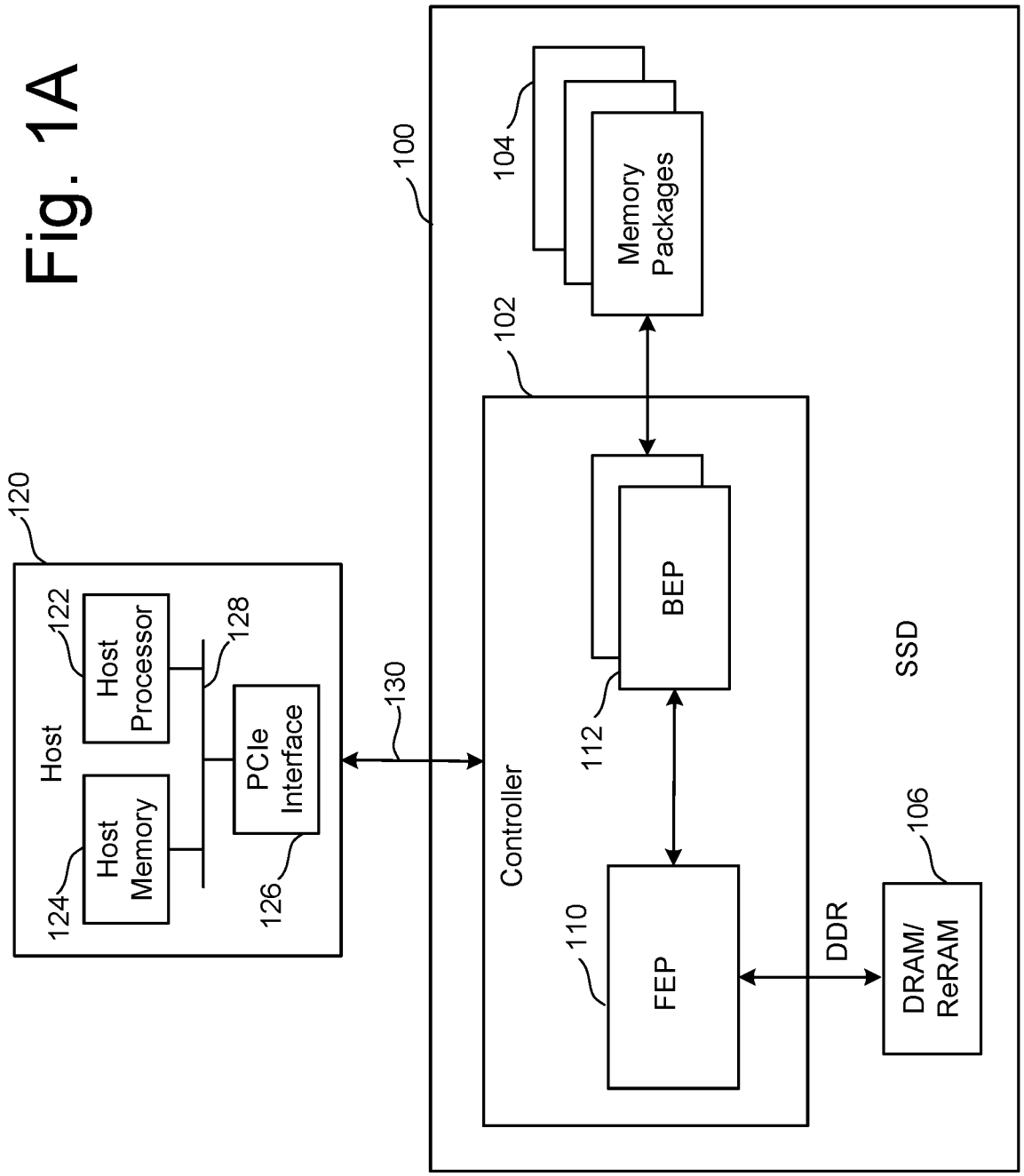
FIG. 1A is a block diagram of one embodiment of a memory system connected to a host.

FIG. 1A is a block diagram of one embodiment of a memory system 100 (data storage system) connected to a host 120. Memory system 100 can be configured to implement aspects of the technology proposed herein. Many different types of memory systems can be used with the technology proposed herein. One example memory system is a solid-state drive ("SSD"); another is a memory card; however, other types of memory systems can also be used. Memory system 100 comprises a Controller 102, nonvolatile memory 104 for storing data, and local memory (e.g., DRAM/ReRAM) 106. Controller 102 comprises a Front-End Processor Circuit (FEP) 110 and one or more Back End Processor Circuits (BEP) 112. In one embodiment FEP circuit 110 is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP 110 and BEP 112 both include their own processors. In one embodiment, FEP circuit 110 and BEP 112 work as a master slave configuration where the FEP circuit 110 is the master, and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other nonvolatile data storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, nonvolatile memory 104 comprises a plurality of memory packages. Each memory package includes one or more memory die. Therefore, Controller 102 is connected to one or more nonvolatile memory die. In one embodiment, each memory die in the memory packages 14 utilize NAND flash memory (including two-dimensional NAND flash memory and/or three-dimensional NAND flash memory). In other embodiments, the memory package can include other types of memory.

Controller 102 communicates with host 120 via an interface 130. For example, interface 130 may be configured according to a standard such as the Secure Digital (SD) standard and/or the Non Volatile Memory express (NVMe) standard (e.g., using PCI Express (PCIe)). For working with memory system 100, host 120 includes a host processor 122, host memory 124, and in this example a PCIe interface 126 connected to bus 128. Host memory 124 is the host's physical memory, and can be DRAM, SRAM, nonvolatile memory or another type of storage. Host 120 is external to and separate from memory system 100. In one embodiment, memory system 100 is embedded in host 120.

Figure 1B:
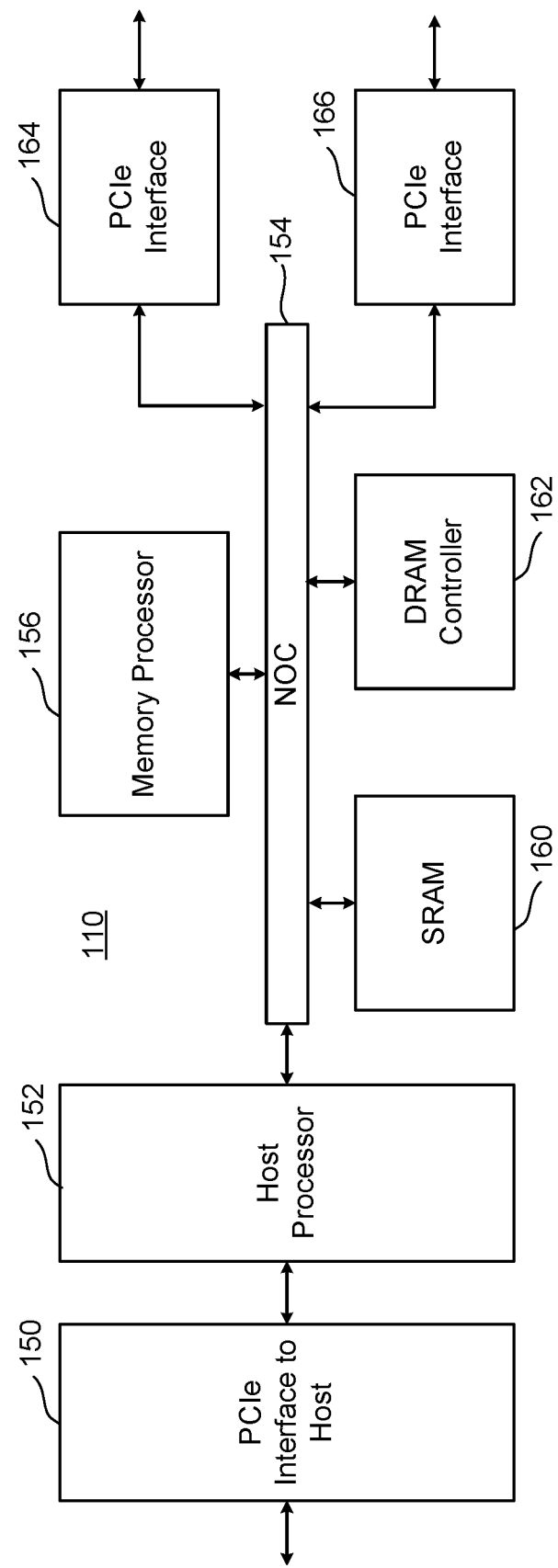
FIG. 1B is a block diagram of one embodiment of a Front-End Processor Circuit. In some embodiments, the Front-End Processor Circuit is part of a Controller.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 1B). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages. Top NOC 202 and connected components including interface 228, processor 220, data path controller 222, XOR engine 224, ECC engine 226, SRAM 230 and Buffer 232 may be considered an example of a Flash Interface Module (FIM). Bottom NOC 204 is associated with an interface 258 for four additional channels for communicating with memory packages. Bottom NOC 204 and connected components including interface 258, processor 250, data path controller 252, XOR engine 254, ECC engine 256, SRAM 260 and Buffer 262 may be considered another example of a FIM. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. Each FIM has one XOR engine and one ECC engine to allow independent data correction and/or recovery. In other embodiments, the XOR engines 224/254 and ECC engines 226/256 can be implemented in software. The scheduler, buffer, and TM Interfaces are hardware circuits.

FIG. 1D is a block diagram of one embodiment of a memory package 104 that includes a plurality of memory die 300 connected to a memory bus 294 (data lines and chip enable lines). The memory bus 294 connects to a Toggle Mode Interface 296 for communicating with the TM Interface of a BEP circuit 112 (see e.g., FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2A:
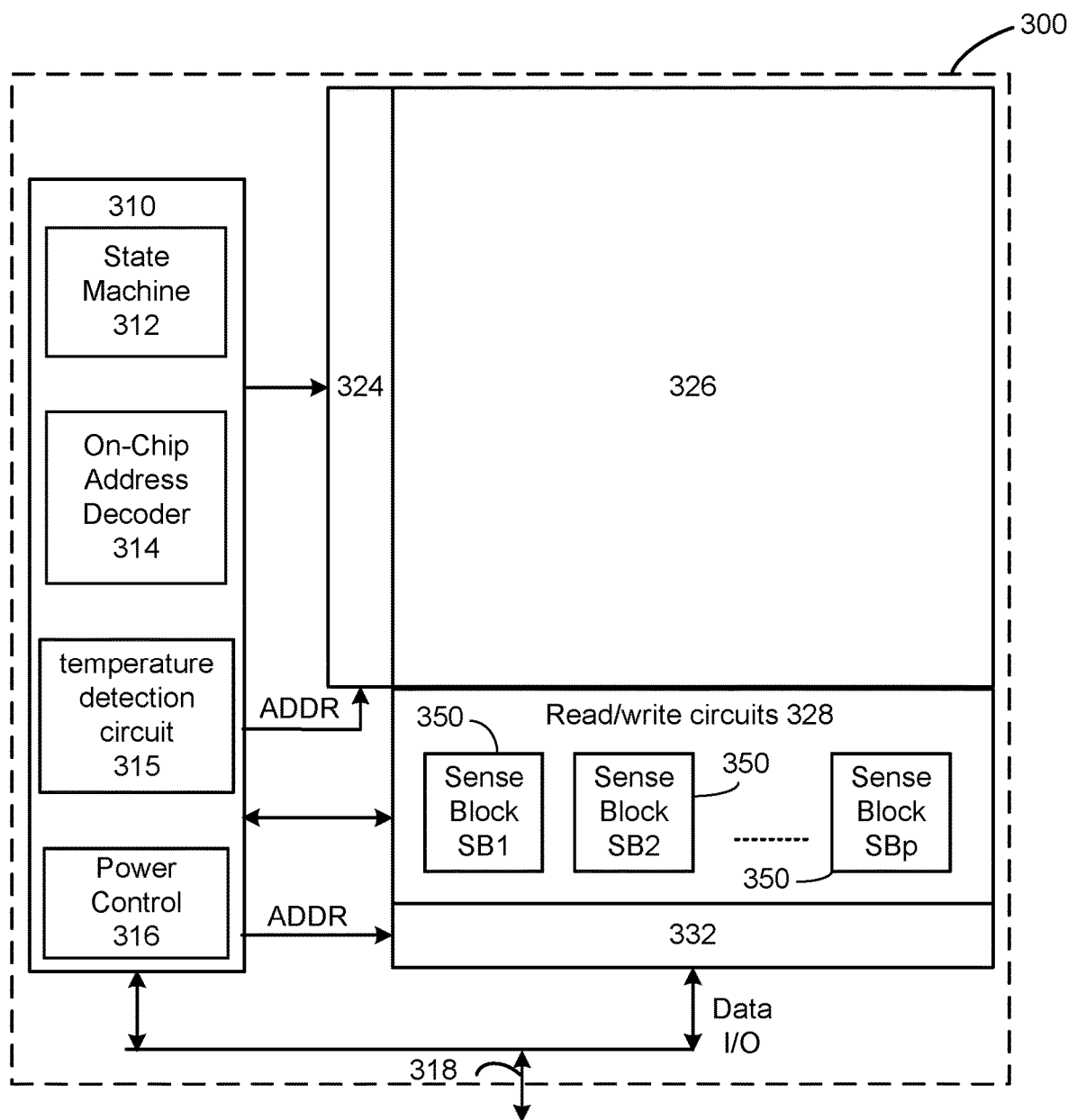
FIG. 2A is a functional block diagram of an embodiment of a memory die.

FIG. 2A is a functional block diagram of one embodiment of a memory die 300. Each of the one or more memory die 300 of FIG. 1D can be implemented as memory die 300 of FIG. 2. The components depicted in FIG. 2 are electrical circuits. In one embodiment, each memory die 300 includes a memory structure 326, control circuits 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2 . . . . SBp (sensing circuits) and allow a page (or multiple pages) of data in multiple memory cells to be read or programmed in parallel. In one embodiment, each sense block includes a sense amplifier and a set of latches connected to the bit line. The latches store data to be written and/or data that has been read. The sense blocks include bit line drivers.

Commands and data are transferred between the controller and the memory die 300 via lines 318, which may form a bus between memory die 300 and the controller (e.g., memory bus 294). In one embodiment, memory die 300 includes a set of input and/or output (I/O) pins that connect to lines 318.

Control circuits 310 cooperate with the read/write circuits 328 to perform memory operations (e.g., write, read, erase, and others) on memory structure 326. In one embodiment, control circuits 310 includes a state machine 312, an on-chip address decoder 314, a power control module 316 (power control circuit) and a temperature detection circuit 315. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuits 310 include buffers such as registers, ROM fuses and other storage devices for storing default values such as base voltages and other parameters.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages.

For purposes of this document, control circuits 310, alone or in combination with read/write circuits 328 and decoders 324/332, comprise one or more control circuits for memory structure 326. These one or more control circuits are electrical circuits that perform the functions described below in the flow charts and signal diagrams. In other embodiments, the one or more control circuits can consist only of controller 102, which is an electrical circuit in combination with software, that performs the functions described below in the flow charts and signal diagrams. In another alternative, the one or more control circuits comprise controller 102 and control circuits 310 performing the functions described below in the flow charts and signal diagrams. In another embodiment, the one or more control circuits comprise state machine 312 (or a microcontroller or microprocessor) alone or in combination with controller 102.

In one embodiment, memory structure 326 comprises a monolithic three-dimensional memory array of nonvolatile memory cells in which multiple memory levels are formed above a single substrate, such as a wafer. The memory structure may comprise any type of nonvolatile memory that is monolithically formed in one or more physical levels of arrays of memory cells having an active area disposed above a silicon (or other type of) substrate. In one example, the nonvolatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two-dimensional memory array of nonvolatile memory cells. In one example, the nonvolatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

In one embodiment, the control circuit(s) (e.g., control circuits 310) are formed on a first die, referred to as a control die, and the memory array (e.g., memory structure 326) is formed on a second die, referred to as a memory die. For example, some or all control circuits (e.g., control circuit 310, row decoder 324, column decoder 332, and read/write circuits 328) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

Figure 2B:
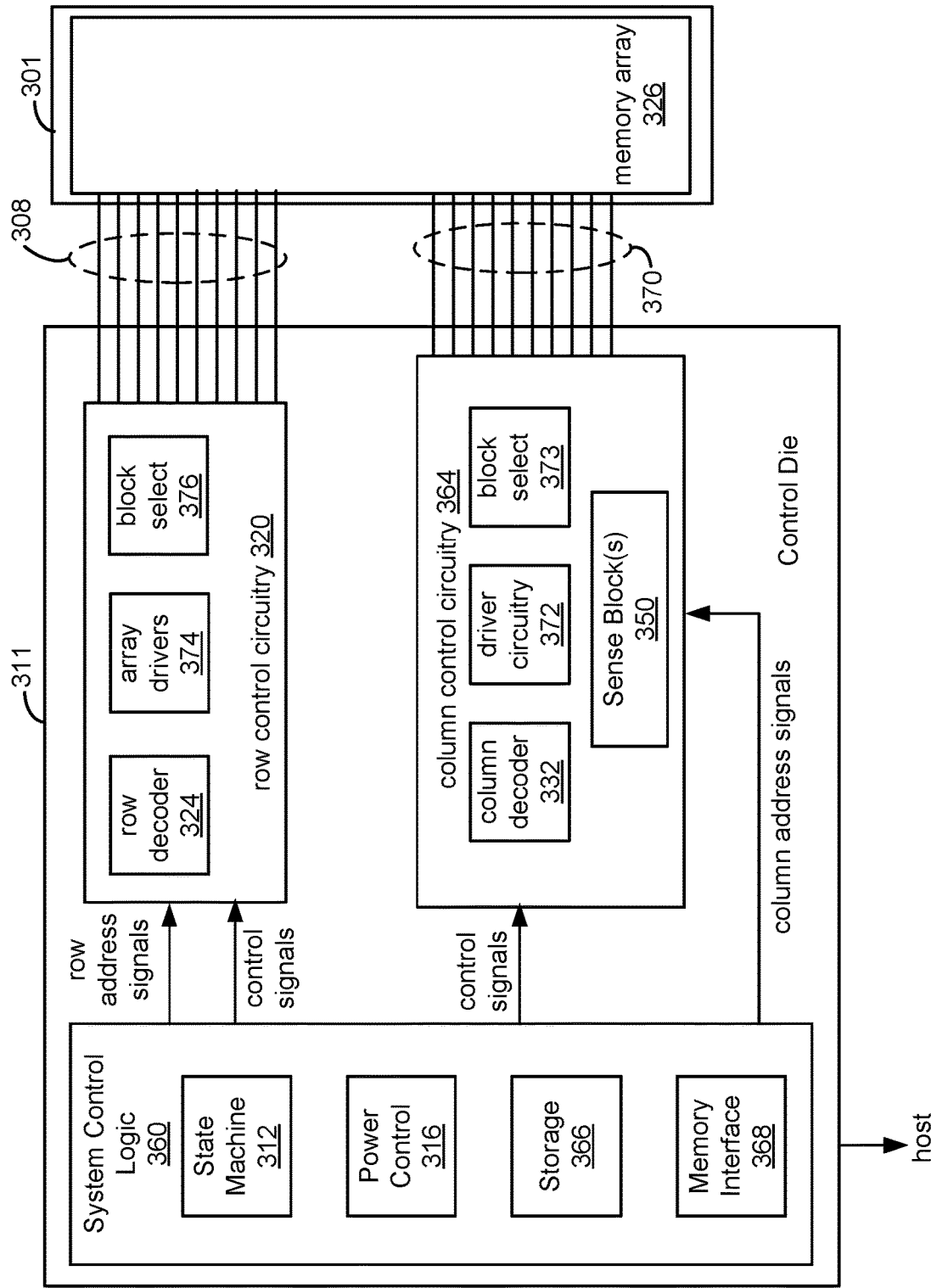
FIG. 2B is a functional block diagram of an embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package 104 in memory system 100. The integrated memory assembly 307 includes two types of semiconductor die (or more succinctly, "die"). Memory die 301 includes memory array 326 (memory structure). Memory array 326 may contain nonvolatile memory cells.

Control die 311 includes column control circuitry 364, row control circuitry 320 and system control logic 360 (including state machine 312, power control module 316, storage 366, and memory interface 368). In some embodiments, control die 311 is configured to connect to the memory array 326 in the memory die 301. FIG. 2B shows an example of the peripheral circuitry, including control circuits, formed in a peripheral circuit or control die 311 coupled to memory array 326 formed in memory die 301. System control logic 360, row control circuitry 320, and column control circuitry 364 are located in control die 311. In some embodiments, all or a portion of the column control circuitry 364 and all or a portion of the row control circuitry 320 are located on the memory die 301. In some embodiments, some of the circuitry in the system control logic 360 is located on the on the memory die 301.

System control logic 360, row control circuitry 320, and column control circuitry 364 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 364). Thus, while moving such circuits from a die such as memory die 301 may reduce the number of steps needed to fabricate such a die, adding such circuits to a die such as control die 311 may not require many additional process steps.

FIG. 2B shows column control circuitry 364 including sense block(s) 350 on the control die 311 coupled to memory array 326 on the memory die 301 through electrical paths 370. For example, electrical paths 370 may provide electrical connection between column decoder 332, driver circuitry 372, and block select 373 and bit lines of memory array (or memory structure) 326. Electrical paths may extend from column control circuitry 364 in control die 311 through pads on control die 311 that are bonded to corresponding pads of the memory die 301, which are connected to bit lines of memory structure 326. Each bit line of memory structure 326 may have a corresponding electrical path in electrical paths 370, including a pair of bond pads, which connects to column control circuitry 364. Similarly, row control circuitry 320, including row decoder 324, array drivers 374, and block select 376 are coupled to memory array 326 through electrical paths 308. Each of electrical paths 308 may correspond to a word line, dummy word line, or select gate line. Additional electrical paths may also be provided between control die 311 and memory structure die 301.

In some embodiments, there is more than one control die 311 and/or more than one memory die 301 in an integrated memory assembly 307. In some embodiments, the integrated memory assembly 307 includes a stack of multiple control die 311 and multiple memory structure die 301. In some embodiments, each control die 311 is affixed (e.g., bonded) to at least one of the memory structure dies 301.

The exact type of memory array architecture or memory cell included in memory structure 326 is not limited to the examples above. Many different types of memory array architectures or memory cell technologies can be used to form memory structure 326. No particular nonvolatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
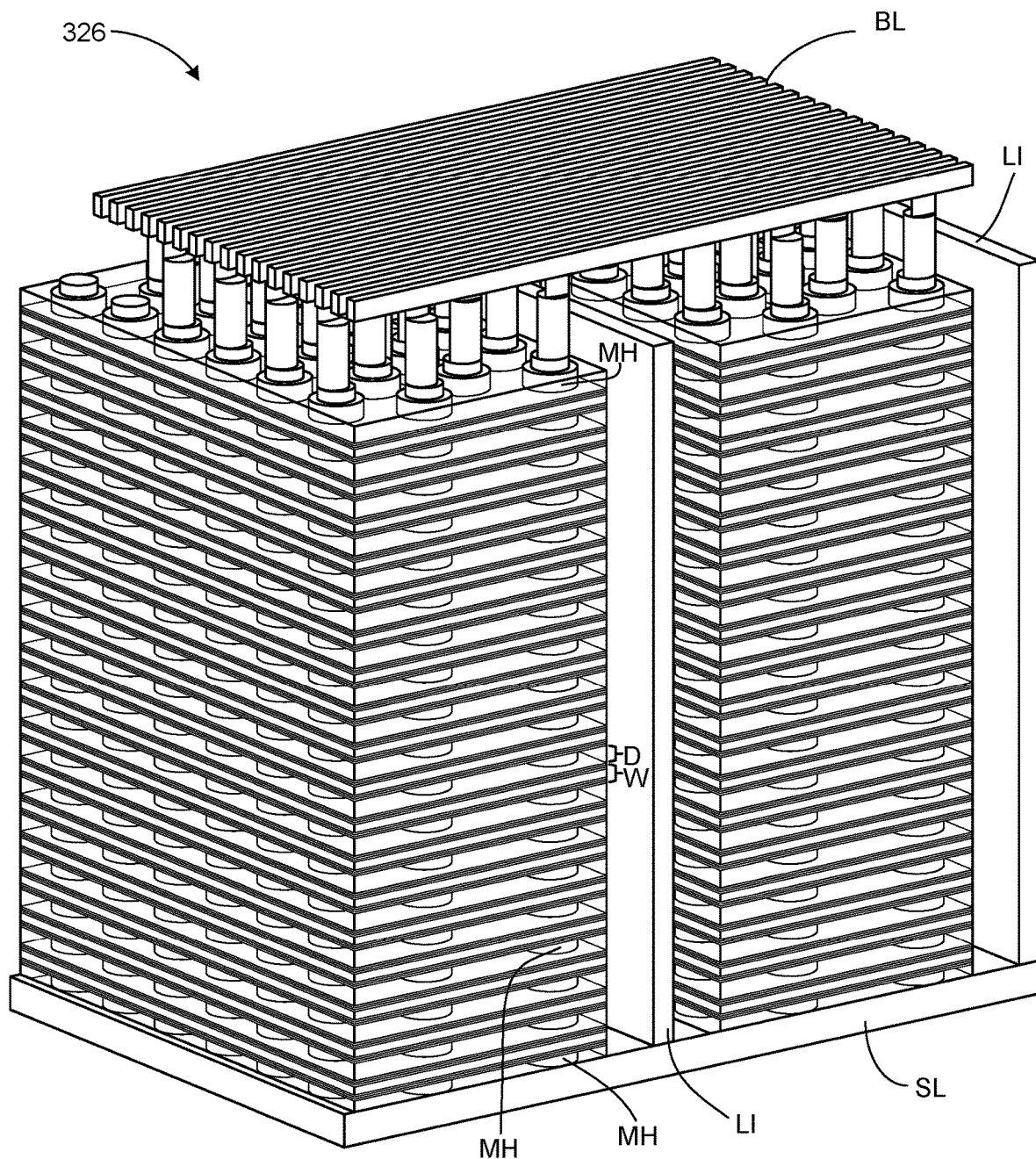
FIG. 3 is a perspective view of a portion of one embodiment of a monolithic three-dimensional memory structure.

FIG. 3 is a perspective view of a portion of one example embodiment of a monolithic three-dimensional memory array that can comprise memory structure 326, which includes a plurality memory cells. For example, FIG. 3 shows a portion of one block of memory. The structure depicted includes a set of bit lines BL positioned above a stack of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. One set of embodiments includes between 108-278 alternating dielectric layers and conductive layers, for example, 127 data word line layers, 8 select layers, 4 dummy word line layers and 139 dielectric layers.

More or fewer than 108-278 layers can also be used. As will be explained below, the alternating dielectric layers and conductive layers are divided into four "fingers" or "strings" by local interconnects LI. FIG. 3 shows two fingers and two local interconnects LI. Below the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data. More details of the three-dimensional monolithic memory array that comprises memory structure 326 is provided below with respect to FIG. 4A-4C.

Figure 4A:
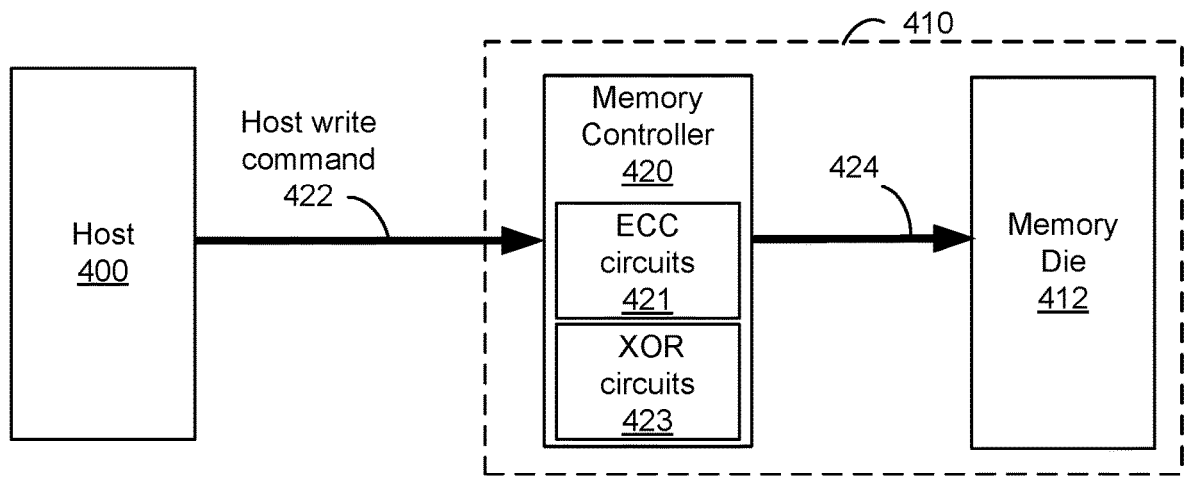
FIGS. 4A-B show an example of a host write command.

FIG. 4A shows an example of a host 400 (e.g., host 120 or other host) in communication with a memory system 410. Memory system 410 includes nonvolatile memory die 412, which includes a nonvolatile memory array (e.g., memory array 326 including nonvolatile memory cells). While a single memory die 412 is shown in FIG. 4 for simplicity of illustration, two or more nonvolatile memory dies may be provided in other examples (e.g., as previously described). Memory die 412 may be implemented similarly to memory die 300 (having on-chip control circuits) or similarly to integrated memory assembly 307 (having control circuits on a control die that is bonded to a memory array die) or using a combination of control circuits on a memory die and on another die. Memory system 410 also includes memory controller 420, which includes control circuits such as ECC circuits 421 and XOR circuits 423. Aspects of the present technology are directed to the configuration of control circuits of a memory controller (e.g., memory controller 420) and/or on a memory die (e.g., on memory die 412). For example, such control circuits may be used to write data in nonvolatile memory cells of memory die 412 (e.g., in response to a host write command) and subsequently read the data (e.g., in response to a host read command). While memory system 410 is shown in simplified form in FIG. 4A, memory system 410 may include some or all of the features previously described with respect to memory system 100 (e.g., memory controller 420 may include features of controller 102 and/or memory die 412 may include features of memory die 300 or integrated memory assembly 307).

In FIG. 4A, host 400 sends host write command 422 with data to be written. Memory controller 420 receives host write command 422 and data. ECC circuits 421 perform ECC encoding of the data and XOR circuits 423 perform XOR operations on portions of the data to be written to generate XOR data. The ECC encoded user data and the XOR data are sent 424 to memory die 412 where they are stored in nonvolatile memory cells. In some memory systems, nonvolatile memory cells may be configurable for operation in two or more configurations that store data differently. For example, nonvolatile memory cells may be configured to store one bit per cell in a Single Level Cell (SLC) format (in nonvolatile memory cells configured as SLC cells) or store more than two bits per cell in a Multi Level Cell (MLC) format (in nonvolatile memory cells configured as MLC cells). In some cases, user data is initially written in SLC format and later copied to another location where it is written in MLC format. Using SLC format initially may provide a high write speed and using MLC provides higher data density. In some cases, XOR data is written in SLC format and is subsequently discarded after related user data is copied and verified as having an acceptable error rate in MLC.

Figure 4B:
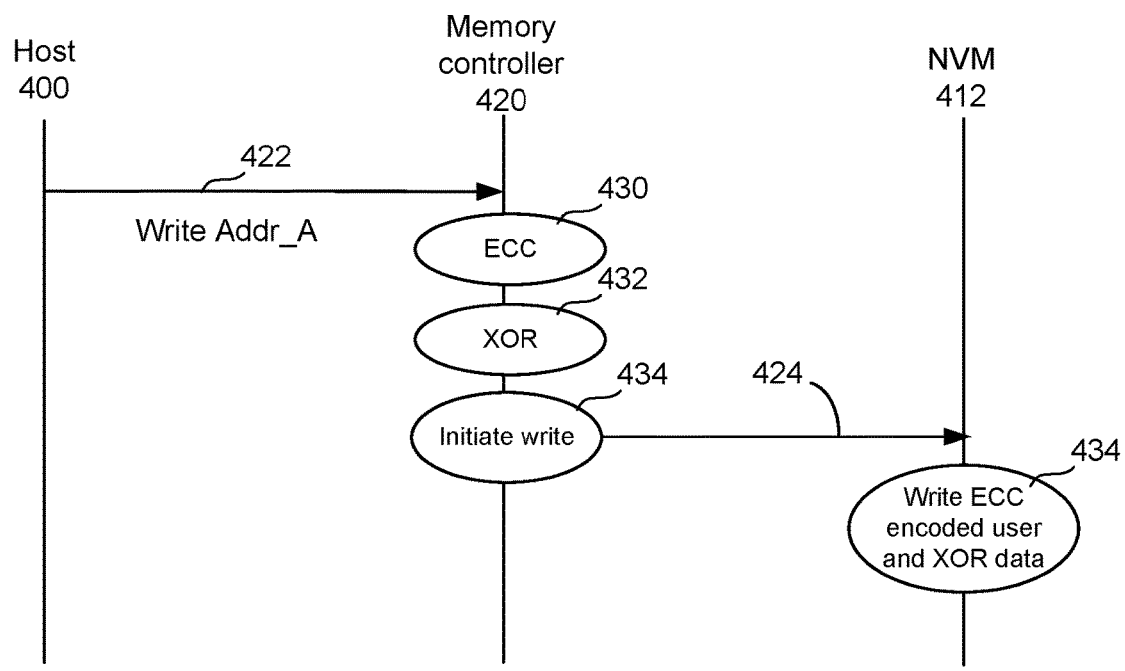

FIG. 4B shows host 400 sending host write command 422 to memory system 410. Memory controller 420 receives host write command 422 and ECC circuits 421 perform ECC encoding 430 of the user data sent with host write command 422. XOR circuits 423 perform XOR operations 432 on portions of the user data to generate XOR data. A write operation is then initiated 434 and the encoded user data and XOR data are sent 424 to nonvolatile memory 412. The ECC encoded user data and the XOR data are written in nonvolatile memory 412 (e.g., in different blocks).

Figure 5A:
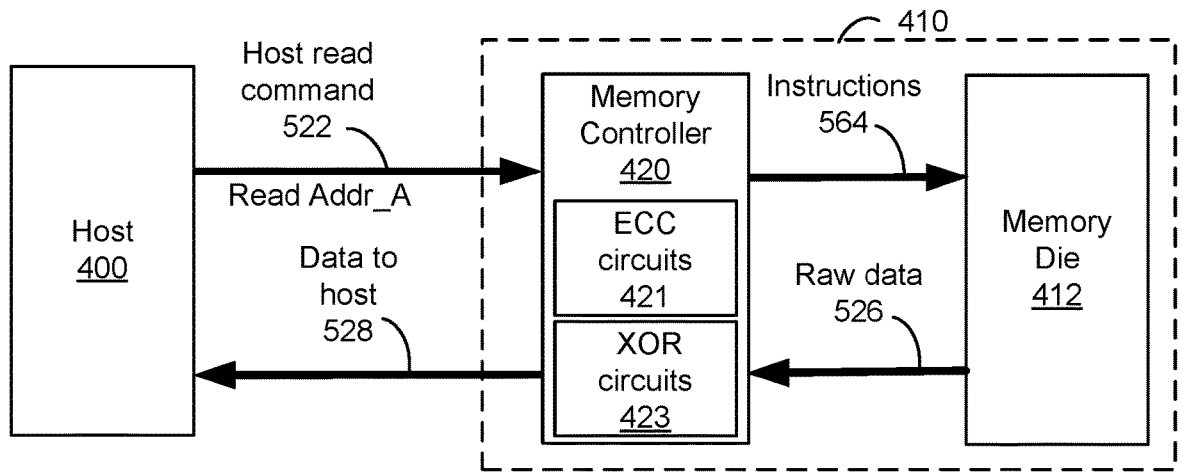
FIGS. 5A-B show an example of a host read command.

FIG. 5A illustrates a read operation including some of the operations performed by memory controller 420 and memory die (nonvolatile memory or "NVM") 412. Host 400 sends a host read command 522 indicating an address "Read Addr_A" to read. In response, memory controller 420 initiates reading of corresponding physical addresses (e.g., obtained from logical to physical conversion of Addr_A by sending instructions 564 to cause the appropriate cells to be selected and appropriate read voltages to be applied). Memory die 412 reads the selected memory cells and sends back raw data 526 to memory controller 420. Memory controller 420 generates corrected data from the raw data 526 and sends the corrected data 528 to host 400.

Generating corrected data 528 may include various techniques that may take different amounts of time. ECC correction by ECC circuits 421 may be used to correct raw data 526. ECC correction may be sufficient to correct most raw data. If the raw data is initially uncorrectable by ECC then one or more data recovery operations may be performed to attempt to recover the data (e.g., to attempt to obtain data that is correctable by ECC). For example, different read voltages may be used to generate second raw data that may be correctable by ECC. Two or more different sets of read voltages may be applied to attempt to obtain correctable data in an example of a recovery operation. In some cases, raw data is subject to Exclusive OR (XOR) operations by XOR circuits 423 to obtain corrected data in another example of a recovery operation. Two or more recovery operations may be performed in series in some cases (e.g., if the first data recovery operation is unsuccessful). For example, when uncorrectable data is encountered, data may be reread using one or more additional set of read voltages to attempt to obtain correctable data and then, if this is unsuccessful, XOR correction may be applied.

Figure 5B:
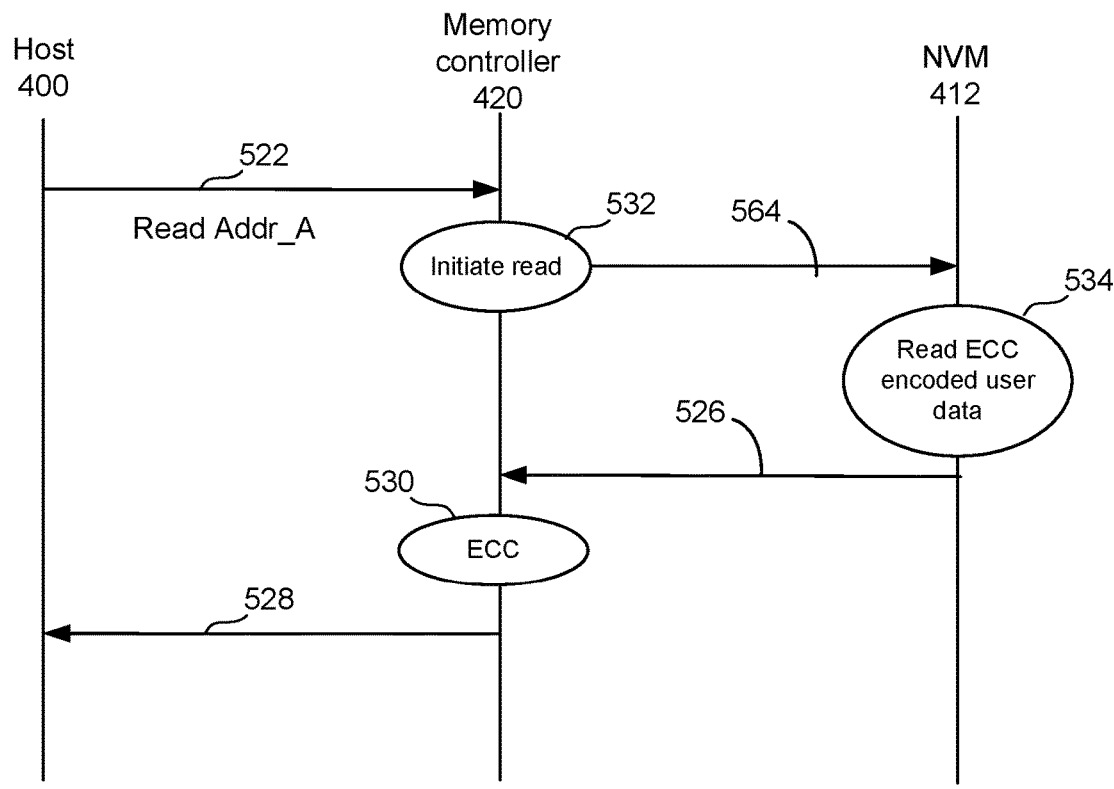

FIG. 5B further illustrates the read operation of FIG. 5B including host 400 sending read command 522 to memory controller 420, which initiates read 532 including sending instructions 564 to memory die 412 to access nonvolatile memory cells at physical locations corresponding to the logical addresses of read command 522. The ECC encoded user data is read 534 by memory die 412 and the raw data is sent 526 to memory controller 420. In the example of FIG. 5B, ECC decoding 530 is performed by memory controller 420 and the corrected data 528 is sent to host 400. While ECC correction is sufficient to correct any errors in raw data in some cases (e.g., as shown in FIG. 5B), in some cases, ECC correction cannot correct raw data (e.g., too many bad bits to correct so that data is Uncorrectable by ECC or UECC) and one or more data recovery techniques may be applied (e.g., XOR).

Figure 6:
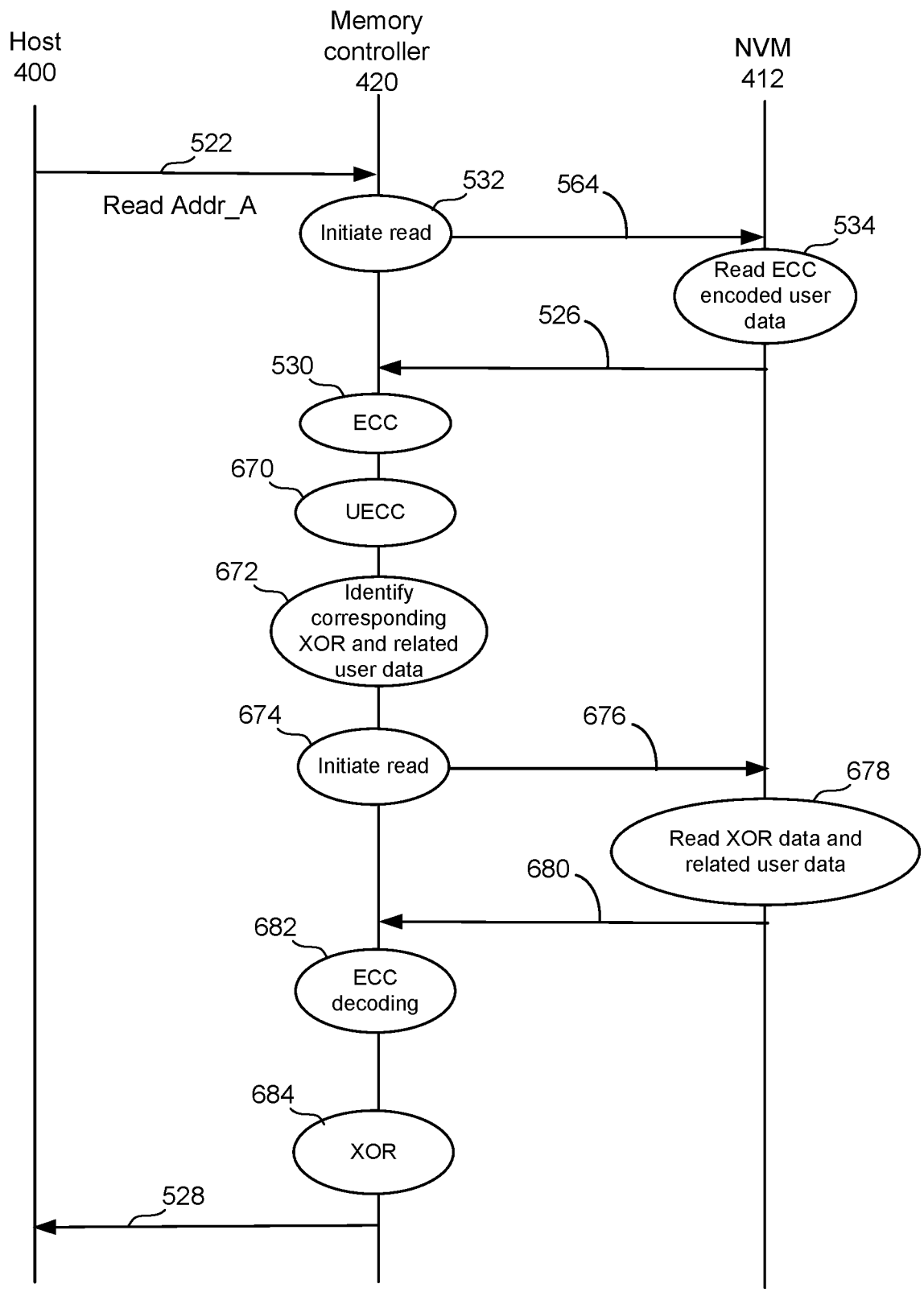
FIG. 6 shows an example of a read of UECC data and data recovery using XOR.

FIG. 6 illustrates an example of a read operation that includes performing XOR operations to recover user data. Host 400 sends read command 522 and memory die returns raw data 526 as in FIG. 5B. In the example of FIG. 6, ECC decoding 530 results in a determination that the raw data is UECC 670. In response, memory controller 420 identifies XOR data corresponding to the UECC data and related user data 672 (e.g., XOR data was generated from the now-UECC data and related user data). Memory controller 420 initiates a read 674 of the XOR data and the related user data and sends instructions 676 to cause the memory die to read the XOR data and related user data 678. The corresponding raw data is sent 680 to memory controller 420 where it is subject to ECC decoding 682 to correct any errors. Subsequently, XOR operations 684 (e.g., by XOR circuits 423) use the corrected XOR data and related user data to recover the data that is UECC (e.g., data having address: Addr_A) and the recovered data 528 is sent to host 400.

Figure 7A:
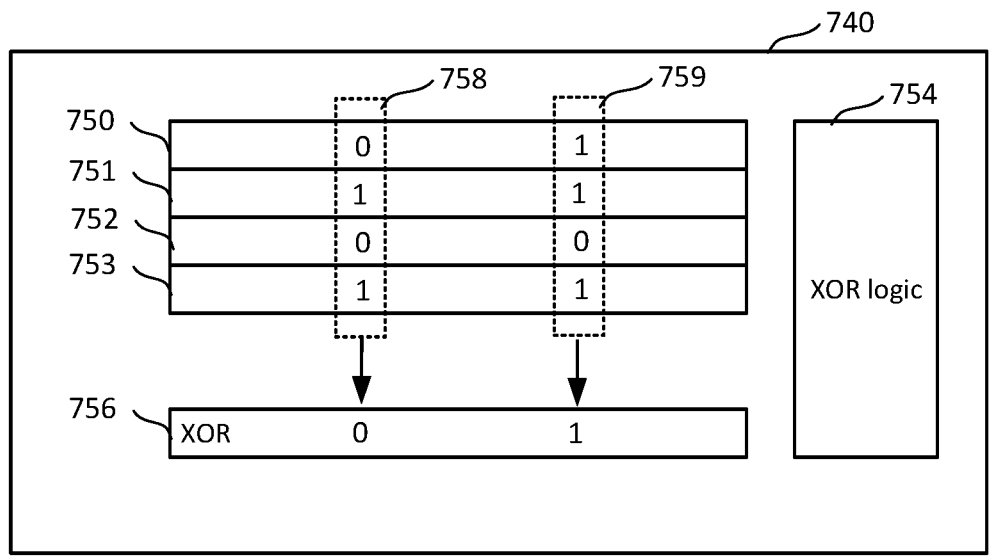
FIGS. 7A-B show an example of a data recovery operation using Exclusive OR (XOR) operations.
Figure 7B:
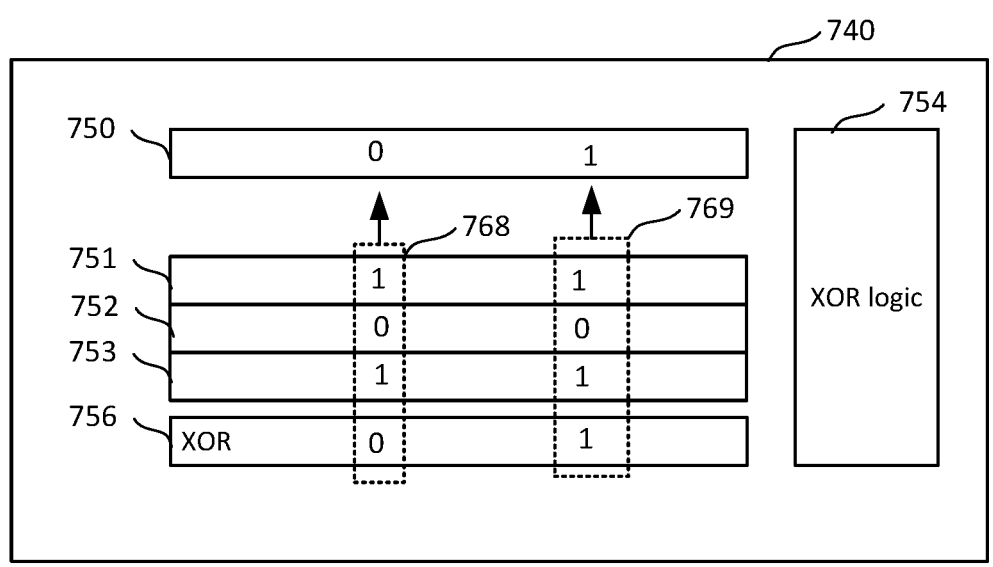

FIG. 7A-B illustrate an example implementation of data recovery using XOR (e.g., XOR 684 of FIG. 6). FIG. 7A shows XOR circuits 740 (e.g., an example implementation of XOR circuits 423) including XOR logic circuit 754 (e.g., XOR engines 224/254) which is configured to perform an XOR logic operation on data to be stored in memory cells and to generate corresponding bits of XOR data (parity data). In the example shown, four portions of user data 750-753 are used to calculate a portion of XOR data 756. In other examples, the number of such portions of stored data used may be different (e.g., fewer or more than four). XOR data 756 may be stored in memory cells with user data. FIG. 7A shows performing an XOR operation on a set of bits 758. XOR logic circuit 754 calculates a corresponding parity bit (in this case "0") corresponding to bits 0101 of set of bits 758. For example, modulo 2 addition or other technique may be used to generate XOR bits (e.g. when there is an even number of "1" bits, the XOR result is a "0" and when there is an odd number of "1" bits, the XOR result is "1"). FIG. 7A shows performing an OR operation on a set of bits 759. XOR logic circuit 754 calculates a corresponding parity bit (in this case "1"). XOR encoding (calculation of XOR bits) may be performed when data is in temporary storage (e.g., latches, DRAM or XRAM) before programming to nonvolatile memory cells. XOR data may be calculated for some or all user data prior to storage in nonvolatile memory.

In an example, user data (e.g., received from a host with a write command) may initially be written in Single Level Cell (SLC) memory in order to maintain a high write speed and low error rate. Subsequently, user data may be moved to Multi-Level Cell (MLC) memory cells where it is stored with high density and may have a higher error rate. XOR data may be calculated when the data is moved to MLC memory cells to provide XOR recovery capability. Such XOR data may be discarded when the corresponding data is stored in MLC memory cells.

FIG. 7B shows an example of error correction using XOR for data recovery (e.g., when a portion of data such as portion 750 is UECC as shown in FIG. 6). XOR logic circuit 754 combines XOR data 756 (e.g. XOR data generated by XOR logic circuit 754 prior to programming as shown in FIG. 7A) and user data related to portion 750 (in this case, portions 751-753). Related portions of data 751-753 and XOR data 756 may be read from nonvolatile memory and corrected by ECC prior to the XOR operation shown (e.g., steps 678 and 682 of FIG. 6). In a first example of XOR decoding 768 (corresponding to XOR encoding 758), bits of related portions 751-753 and XOR data 756 are XORed together to generate a "0" in portion 750. In a second example of XOR decoding 769 (corresponding to XOR encoding 759), bits of related portions 751-753 and XOR data 756 are XORed together to generate a "1" in portion 750. In this way, each bit of portion 750 can be recovered by combining corresponding XOR data (e.g., portion 756) and related user data (e.g., portions 751-753).

Figure 8A:
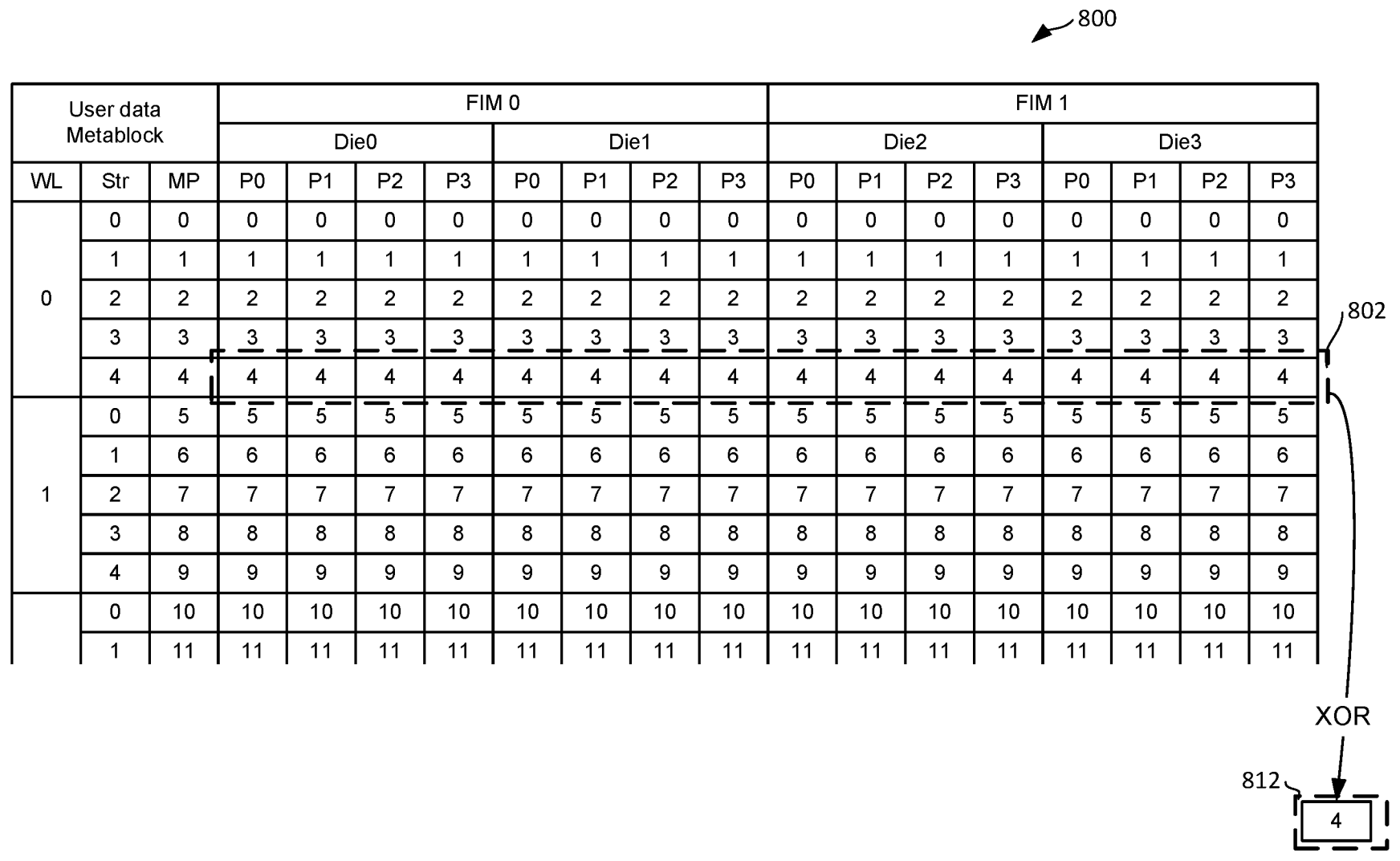

FIGS. 8A-B show an example of an XOR scheme to protect data stored in a nonvolatile memory array (e.g., memory array 326). In the example shown, the nonvolatile memory array is formed on multiple memory dies (Die0, Die1, Die2 and Die3), with two dies connected to each FIM (e.g., Die0 and Die1 connected to FIM0, Die2 and Die3 connected to FIM1). Each die includes four planes (P0, P1, P2 and P3) as indicated on corresponding columns. A portion of a metablock 800 that includes two word lines (WL0 and WL1) is shown in FIG. 8A. Each word line (e.g., WL0 and WL1) includes six strings. Pages of the same string of different planes across the four dies (Die0 to Die3) are linked to form a corresponding metapage with entries in the plane columns (P0-P3 of Die to Die3) indicating which metapage a page belongs to. For example, string ("Str") 0 of WL0 corresponds to Metapage ("MP") 0, string 1 corresponds to metapage 1 and so on as shown by the rows of FIG. 8A. In this example, data that forms a metapage (e.g., data stored in the same string of all planes shown) is subject to an XOR operation to generate XOR data. For example, pages 802 (16 pages in this example) of metapage 4 (string 4 of WL0) are treated as individual portions of data for XOR encoding (e.g., portions 750-753 of FIG. 7A), which generates XOR data 812. In this scheme, each metapage of user data generates a page of XOR data (e.g., pages 802 of metapage 4 are XORed to generate a page of XOR data 812). Because a relatively large number of pages (16) are XORed together in this scheme and the pages are associated with different FIMs, the time to access all data necessary for XOR recovery of a page may be significantly more.

FIG. 8B shows storage of XOR data in a dedicated XOR metablock 810. XOR data for multiple metapages of user data may be stored in XOR metablock 810, with each page of XOR metablock 810 storing XOR data for one metapage of user data (entries indicate the number of the metapage of user data that generated the page of XOR data). For example, XOR data 812 generated from pages 802 of metapage 4 in FIG. 8A is stored in a page at string 0, plane 0 of Die1 in XOR metablock 810. One metapage of XOR metablock 810 includes 16 pages and accordingly can store XOR data for 16 metapages of user data.

In order to recover data in a scheme such as shown in FIGS. 8A-B, the XOR data and all related user data may be read from the nonvolatile memory and subject to XOR operations. For example, if any page of metapage 4 (any page marked "4") is found to be UECC, related user data (e.g., all other pages of metapage 4, all marked "4" in FIG. 8A) and related XOR data 812 may be read from nonvolatile memory and used to recover the UECC page. In some cases, reading these 16 pages (15 pages of related user data plus one page of XOR data) across different die attached to different FIMs may be time-consuming and complex. Recovery of a page of data in such a scheme may only be possible if all other pages in the metapage and the XOR data are correctable by ECC when they are read. If two or more pages in the same metapage are UECC, it may be impossible to recover the pages using XOR. In some memory dies (e.g., memory dies having a large number of defects, which may be detected during testing and used to categorize dies accordingly), UECC pages may occur relatively frequently so that having more than one UECC page in a metablock may occur with significant frequency, which may make XOR recovery as illustrated in FIGS. 8A-B unsatisfactory.

Aspects of the present technology are directed to addressing problems associated with XOR data recovery in nonvolatile memory dies, for example, in nonvolatile memory dies in which UECC pages are encountered relatively frequently. Aspects of the present technology allow nonvolatile memory dies, including nonvolatile memory dies with relatively large numbers of UECC pages, to be used reliably so that UECC data can be recovered using XOR. Aspects of the present technology include schemes for applying XOR that can recover multiple UECC pages in a metablock (e.g., recovering as many as three UECC pages out of four pages). In general, aspects of the present technology may allow recovering as many as N−1 UECC pages out of N pages associated with a FIM.

While the previous examples showed applying XOR operations to four portions (FIGS. 7A-B) or sixteen portions (FIGS. 8A-B) to generate one portion of XOR data, in some examples, an XOR operation may be applied to generate a portion of XOR data from two portions of user data (e.g., a page of XOR data generated as XOR product of two pages of user data). Furthermore, a portion of user data may be subject to multiple XOR operations with different additional portions of user data to generate different XOR data.

Figure 9:
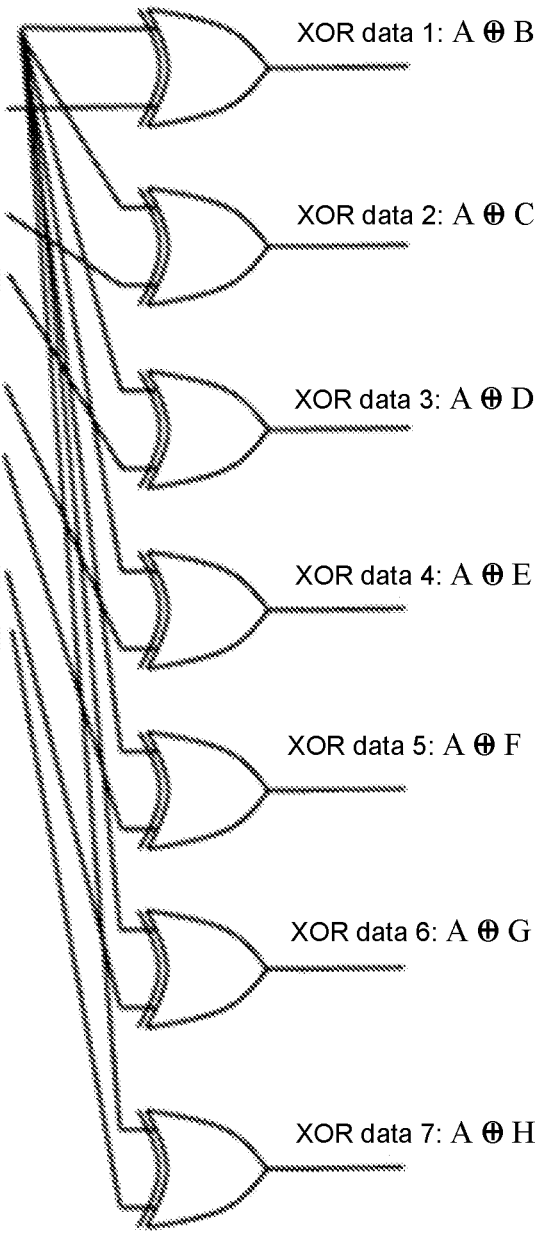
FIG. 9 shows an example of XOR circuits.

FIG. 9 illustrates an example in which a portion of data, Page A, is subject to multiple XOR operations in combination with multiple additional portions of data, Page B-Page H, with each XOR operation applied to only two portions of data. For example, a first XOR operation is applied to the first portion of data, Page A, and a second portion of data, Page B, to generate a first page of XOR data, XOR data 1: A⊕B. A second XOR operation is applied to the first portion of data, Page A, and a third portion of data, Page C, to generate a second page of XOR data, XOR data 2: A⊕C. A third XOR operation is applied to the first portion of data, Page A, and a fourth portion of data, Page D, to generate a third page of XOR data, XOR data 3: A⊕D and so on. In this example, Page A is XORed with seven other pages of data, Pages B-H, to generate seven pages of XOR data, XOR data 1-7 as shown. This allows Page A to be recovered in multiple ways using different additional pages so that if Page A and one or more of Pages B-H are UECC, it may still be possible to recover Page A using a page that is correctable with associated XOR data. For example, if Pages A, B, C and/or D are UECC, Page A can still be recovered using Page E, F, G or H. A portion of data (e.g., a page) may be protected by generating a number "m" portions of XOR data, where the larger the value of "m" the more protection is provided. Aspects of the present technology include XORing portions of data with two or more additional portions of data so that a portion of data can be recovered even when an additional portion of data is also UECC. This distributed XOR approach may be particularly useful in nonvolatile memory dies that have high error rates and high occurrence of UECC data.

Figure 10:
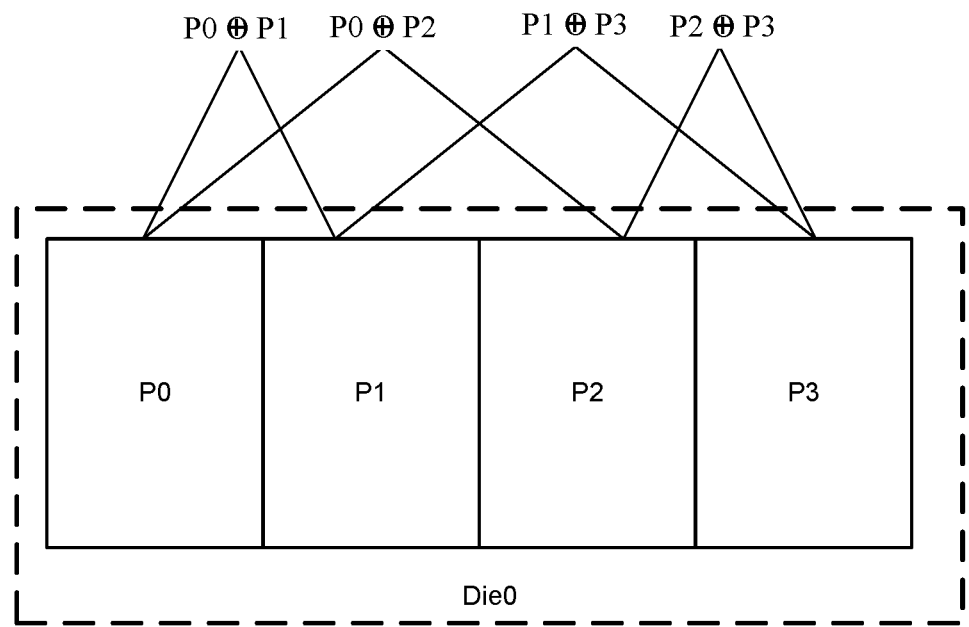
FIG. 10 shows an example of a distributed XOR scheme applied to four planes.

FIG. 10 illustrates an example of distributed XOR used in a nonvolatile memory die (Die0) that includes four planes (e.g., P0-P3). For example, distributed XOR applied to Die0 of FIG. 8A. Planes P0-P3 of Die0 are connected to the same FIM (e.g., FIM 0) so that XOR operations shown are directed to data accessed by one FIM and may not require any access to data via another FIM (unlike the scheme of FIG. 8A).

In FIG. 10, a first XOR operation is performed between data of Planes 0 and 1 to generate first XOR data (P0 ⊕P1), a second XOR operation is performed between data of Planes 0 and 2 to generate second XOR data (P0 ⊕P2), a third XOR operation is performed between data of Planes 1 and 3 to generate third XOR data (P1 ⊕P3) and a fourth XOR operation is performed between data of Planes 2 and 3 to generate fourth XOR data (P2 ⊕P3). In this example, XOR operations are performed on portions of user data assigned to four planes (P0-3) of a Flash Interface Module (FIM) such that each portion of data in a plane is subject to individual XOR operations with user data from at least two other planes. This scheme allows UECC data from any plane to be recovered even if data of one or more other plane is UECC. For example, if portions of data from planes 0 and 1 are both UECC and data of Plane 0 cannot be recovered using the first XOR data (P0 @ P1), the data from Plane 0 may be recovered using the second XOR data (P0 @ P2) and the data from plane 2 (if it is correctable). While this example ensures that there are two ways to recover a portion of data using XOR data, other examples may ensure more than two ways (e.g., by XORing with additional user data to generate additional XOR data).

Figure 11:
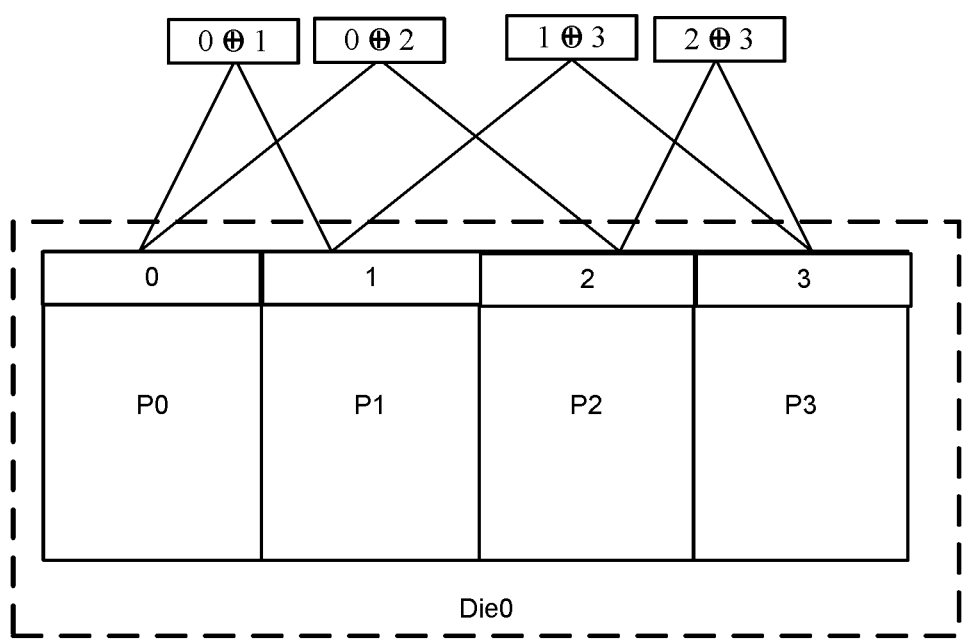
FIG. 11 shows an example of a distributed XOR scheme applied to four pages.

FIG. 11 shows how the distributed XOR scheme of FIG. 10 may be applied on a page-by-page basis. The distributed XOR scheme is applied to pages of user data including page 0 in plane 0, page 1 in plane 1, page 2 in plane 2 and page 3 in plane 3 to generate pages of XOR data as shown. Each page of XOR data is generated by XORing together two pages of user data (e.g., pages 0 and 1 to generate the first page of XOR data (0⊕1), pages 0 and 2 to generate the second page of XOR data (0⊕2), pages 1 and 3 to generate the third page of XOR data (1⊕3) and pages 2 and 3 to generate the fourth page of XOR data (2⊕3). Because all pages are from planes that are connected to the same FIM (e.g., FIM 0), there is no need to access data across multiple FIMs, which may allow rapid data access and relatively rapid recovery of any UECC data (e.g., faster than the example of FIG. 8A, which included 16 pages across two FIMs).

Figure 12:
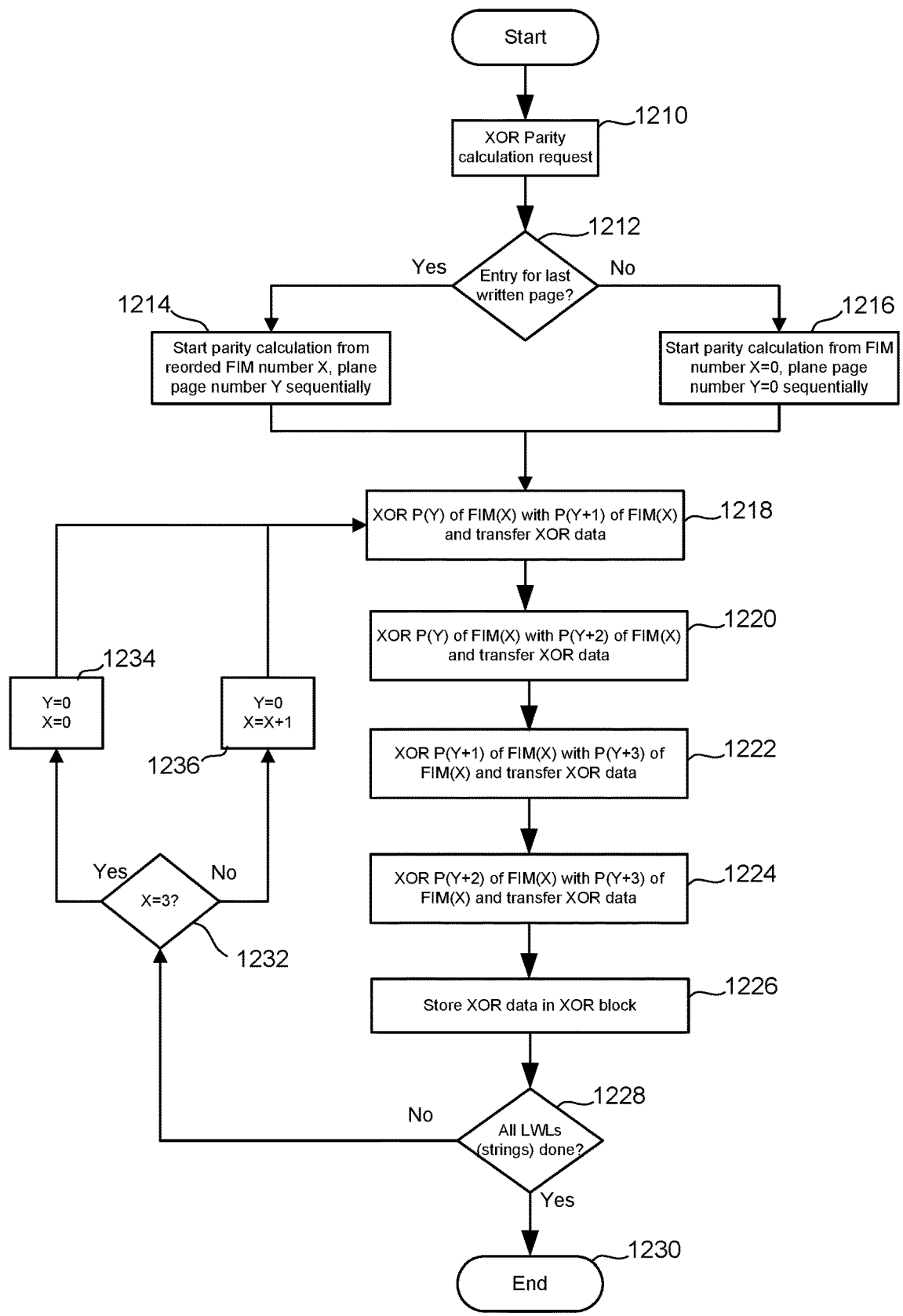
FIG. 12 shows an example of a method that includes XORing pages of user data of a FIM so that each page is XORed with at least two other pages.

FIG. 12 shows an example of a method that includes applying XOR to two pages of data at a time so that each page is XORed with two other pages associated with the same FIM. The method includes receiving an XOR parity calculation request 1210 (e.g., directed to user data stored along a word line in nonvolatile memory) and making a determination as to whether there is an entry for a last written page 1212 (e.g., a control block may track XOR operations for written pages of an open block and the control block may be checked for a corresponding entry). If there is such an entry then the method includes starting XOR calculation from the recorded FIM number X, plane page number Y sequentially 1214 (e.g., performing XOR on portions of data starting from immediately after the last entry at FIM(X), Plane(Y) and proceeding sequentially). If no entry is found, parity calculation is started from FIM number X=0, plane page number Y=0 sequentially 1216 (e.g., starts from the beginning of the metablock and proceeds sequentially). A first XOR operation is performed starting at FIM(X) plane page Y, "XOR P(Y) of FIM(X) with P(Y+1) of FIM(X) and transfer XOR data" 1218. For example, with X and Y equal to zero, the first XOR operation may be between P0 and P1 of FIM0 as shown in FIGS. 10 and 11 and the resulting page of XOR data may be transferred to temporary storage (e.g., in a volatile memory such as XRAM). A second XOR operation is performed between P(Y) and P(Y+2) of the same FIM, "XOR P(Y) of FIM(X) with P(Y+2) of FIM(X) and transfer XOR data" 1220 (e.g., XOR P0 and P2 of FIM0). A third XOR operation is performed between P(Y+1) and P(Y+3) of the same FIM, "XOR P(Y+1) of FIM(X) with P(Y+3) of FIM(X) and transfer XOR data" 1222 (e.g., between P0 and P2 of FIM0). A fourth XOR operation is performed between P(Y+2) and P(Y+3) of the same FIM, "XOR P(Y+2) of FIM(X) with P(Y+3) of FIM(X) and transfer XOR data" 1224 (e.g., between P2 and P3 of FIM0). The method further includes storing XOR data in an XOR block 1226 (e.g., transferring XOR data obtained from steps 1218, 1220, 1222 and 1224 from temporary storage, such as XRAM, to an XOR metablock in nonvolatile memory). Subsequently, a determination is made as to whether all local word lines (or strings) have completed XOR operations "All LWLs (strings) done?" 1228. If all strings have completed XOR operations then the operation ends 1230.

If all LWLs (strings) have not completed XOR operations 1228 then a determination is made as to whether the current value of X is 3 "X=3?" 1232. If X=3 then X and Y are both reset to 0 "Y=0 X=0" 1234 (e.g., X=3 indicates that the last FIM in a four-FIM arrangement has completed XOR and may restart at FIM 0 of the next string). If X is not 3, then X is incremented, "Y=0, X=X+1" 1236. Subsequently, XOR continues from step 1218 for the pages of the next FIM (e.g., FIM 0 of next string or FIM X+1) until all LWLs are done.

Figures 13A, 13B:
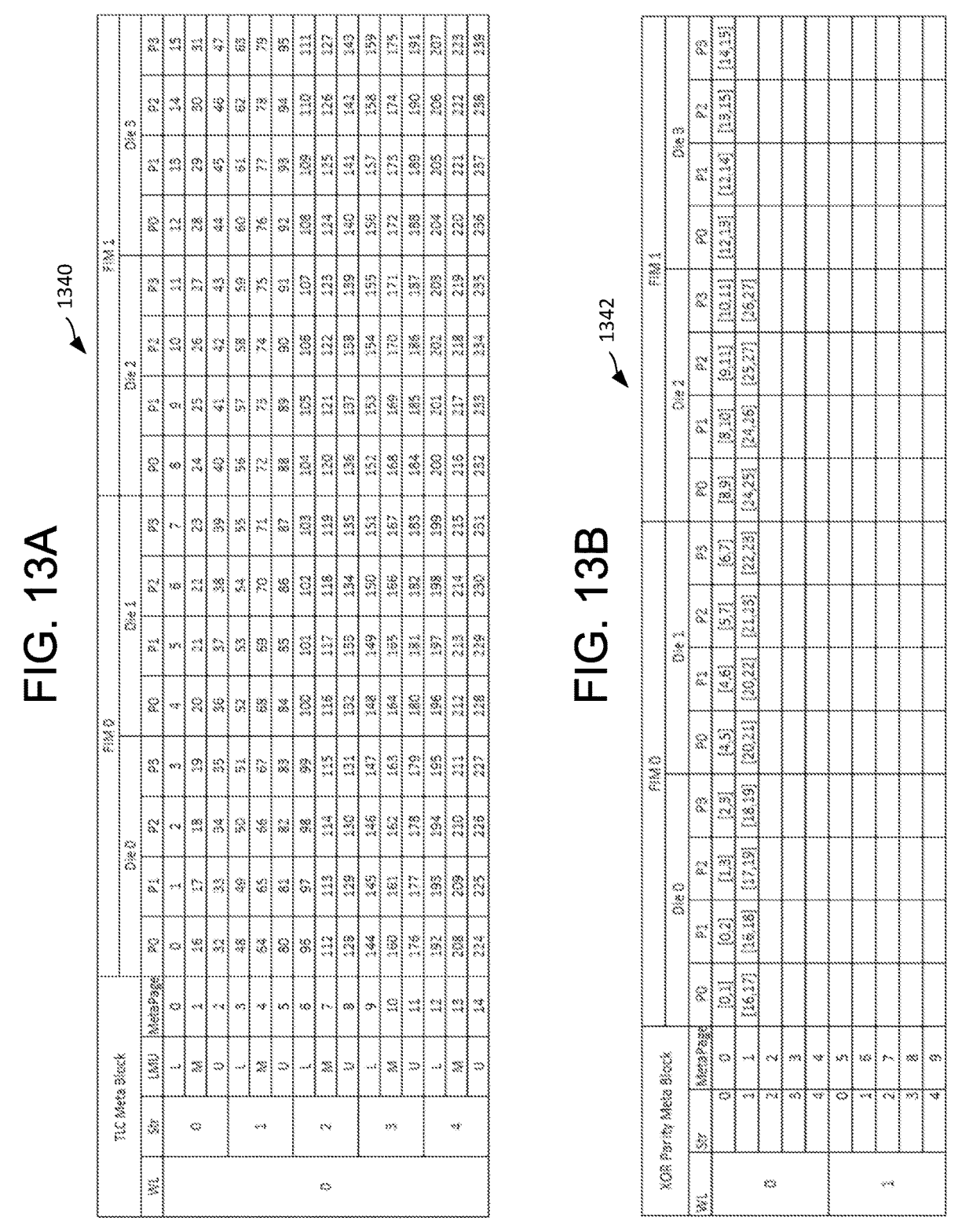

FIGS. 13A-B illustrate an example of how aspects of the present technology may be applied in a non-volatile memory system. FIG. 13A shows storage of user data along a word line (WL0) of a metablock 1340 (a user data block) in a memory system that includes eight planes per FIM (e.g., four planes per die and two dies per FIM). Metablock 1340 is configured as Tri-Level Cell (TLC) metablock to store three logical pages of data in a physical page of nonvolatile memory cells (e.g., each nonvolatile memory cell stores three bits of data, one each from a Lower "L", Middle "M" and an Upper "U" page). Logical pages of data are numbered sequentially across metapages (e.g., metapage 0 consists of logical pages 0 to 15, metapage 1 consists of logical pages 16 to 31, and so on).

FIG. 13B shows an example of an XOR metablock 1342 that includes XOR data obtained from the user data in metablock 1340. XOR metablock 1342 is configured as a SLC metablock to store one logical page of XOR data per physical metapage of nonvolatile memory cells (e.g., each nonvolatile memory cell stores one bit). Page entries indicate the pages of user data that were XORed to produce the XOR data of the page. For example, for metapage 0 (WL0, string ("Str") 0), Die 0, the page in plane 0 ("P0") has XOR data from XORing user data pages 0 and 1 (e.g., 0⊕1, written as "[0,1]"), the page in plane P1 has XOR data from XORing user data pages 0 and 2 (e.g., 0⊕2, written as "[0,2]"), the page in plane P2 has XOR data from XORing user data pages 1 and 3 (e.g., 1⊕3, written as "[1,3]") and the page in plane P3 has XOR data from XORing user data pages 2 and 3 (e.g., 2⊕3, written as "[2,3]"). Thus, the XOR data generated by XORing pages of Die 0 is stored in planes of Die 0 so that no access to data of other dies is required. Similarly, in Die 1, entries for metapage 0 consist of [4,5], [4,6], [5,7] and [6,7] corresponding to pages of user data 4-7 of Die 1 in metablock 1340. With XOR data obtained by XORing two pages at a time from the same die and storing the resulting XOR data in the same die, the present scheme may be implemented independently in each die connected to a FIM without die-to-die or FIM-to-FIM data transfer, which would require additional resources and could increase the time required. For example, additional buffer capacity may be needed for large numbers of pages and additional time may be needed for transfer of data between FIMs and for the more complex XOR operations that span a large number of pages of data (e.g., XORing 16 pages may take significantly longer than XORing 2 pages of data).

Because the number of pages of XOR data is equal to the number of pages of user data in this scheme (e.g., four pages of user data 0-3 result in four pages of XOR data [0,1], [0,2], [1,3] and [2,3]) and user data is stored in TLC format (three bits per cell) while XOR data is stored in SLC format (one bit per cell), XOR data for a metablock of user data (e.g., metablock 1340) may occupy three XOR metablocks (e.g., XOR metablock 1342). In some cases, XOR metablocks may be erased after the associated user data is safely stored with a high degree of confidence. For example, in some cases data is initially written in SLC format and subsequently written in TLC or other higher-density format which may result in errors. An Extended Post Write Read (EPWR) operation may include reading the TLC data to determine the number of errors in the TLC data to ensure an acceptable error rate (e.g., an error rate below a threshold error rate). XOR data may be maintained until EPWR confirms that TLC data has an acceptable error rate and may then be erased thereby making XOR metablocks available for new data.

Figure 14:
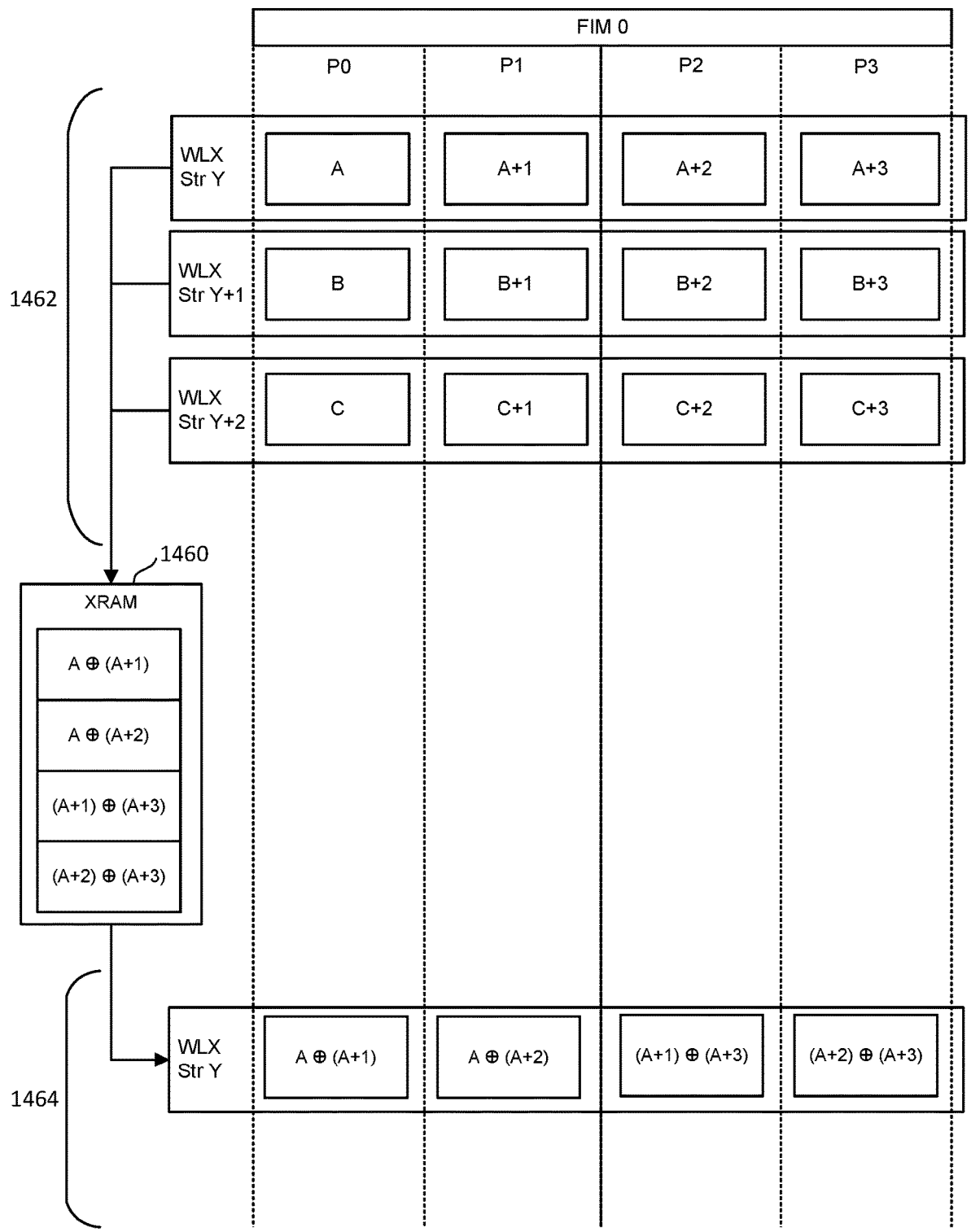
FIG. 14 illustrates temporary storage of XOR data in XRAM.

FIG. 14 shows an example of how temporary storage (XRAM in this example) may be used to hold XOR data prior to storing it in nonvolatile memory. FIG. 14 shows a FIM (FIM 0) that is connected to four planes of nonvolatile memory (P0 to P1, which may be on two dies as in FIGS. 10-11). User data is shown stored in nonvolatile memory cells of strings Y. Y+1 and Y+2 of WLX of a metablock 1462. User data is stored in pages of uniform size (e.g., 16 KB each) that are labeled according to plane (e.g., String Y includes pages A, A+1, A+2 and A+3 in planes P0, P1, P2 and P3 respectively). As XOR operations are performed between pages of user data, the resulting XOR data is stored. For example, FIG. 14 shows results of XOR operations performed on pages A to A+3 of String Y including XOR pages: A⊕(A+1), A⊕(A+2), (A+1)⊕(A+3) and (A+2)⊕(A+3), which are initially stored in XRAM 1460 and subsequently stored in nonvolatile memory cells of WLX, Str Y, of XOR metablock 1464. Subsequently (e.g., after user data pages A to A+3 are confirmed as being written in TLC format with an adequate error rate (e.g., an error rate below a threshold), the XOR data may be discarded (e.g., XOR metablock 1464 may be erased after all XOR data it contains is obsolete because associated user data is confirmed as written with an acceptable error rate).

FIG. 15A shows an example of how aspects of the present technology may be implemented when reading data. Host 400 sends host read command 522 and data is read from NVM 412, transferred to FIM(X) of memory controller 420 and subject to ECC decoding 1502, which results in UECC 670 (e.g., as shown in FIG. 6). In response to finding that data (e.g., page 0) is UECC 760, corresponding first XOR and first related user data are identified 1504 (e.g., XOR data [0,1] and page 1), a read is initiated 1506 and the first XOR and first related user data are read 1508 and subject to ECC decoding 1510. When the first XOR data and/or first related user data are found to be UECC 1512, second XOR data and second related user data (e.g., XOR data [0,2] and page 2) are identified 1514, a read is initiated 1516 and the second XOR data and second related user data are read 1518 and returned to FIM(X) where they are subject to ECC decoding 1520. When ECC decoding 1520 generates corrected second XOR data and second related user data (e.g., both are correctable) the corrected data is subject to XOR operation 1522 to generate the data identified in the read command (e.g., data having address: Addr_A). The recovered data 528 is sent to host 400. Because all pages of user data and XOR data are stored in locations that are connected to FIM(X), the steps of FIG. 15A may be carried out by FIM(X) and no access to other FIMs is needed.

In some cases, pages may be read in parallel (e.g., pages of user data of the same metablock may be read in parallel) so that, for example, logical pages 0, 1, 2 and 3 of FIM 0 of FIG. 13A may be read in parallel (e.g., sequential reads shown in FIG. 15A may not be needed). Similarly pages of XOR data in a common metablock may be read in parallel (e.g., XOR data [0,1], [0,2], [1,3] and [2.4] of FIG. 13B). The scheme of FIGS. 13A-B may enable XOR recovery of a page of data using only two read operations (e.g., a first read operation to read logical pages 0, 1, 2 and 3 and a second read operation to read XOR data [0,1], [0,2], [1,3] and [2,4]).

Figure 15B:
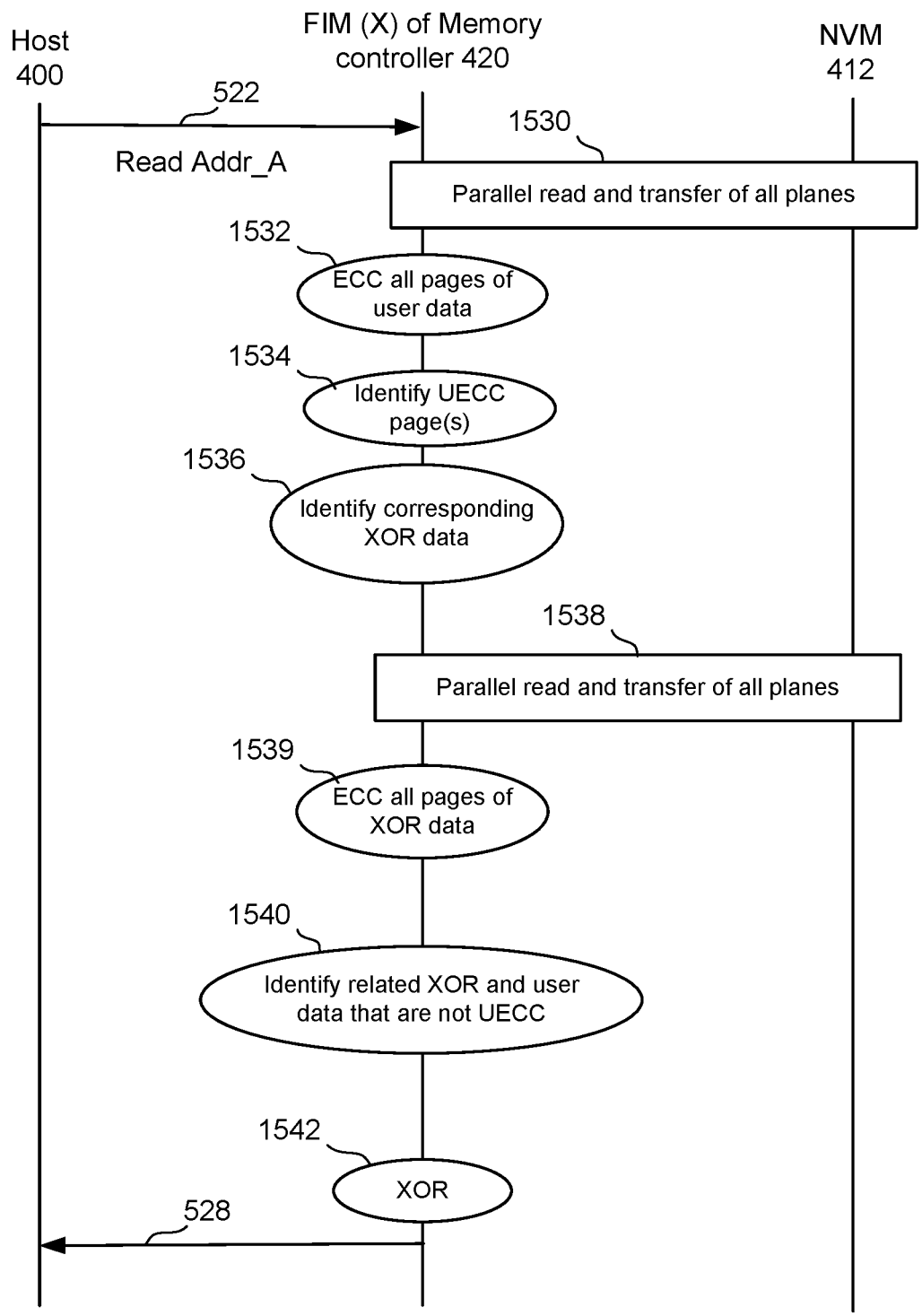

FIG. 15B shows an example that includes receiving read command 522 from host 400 and parallel read and transfer of data from all planes 1530 (e.g., reading all planes, P0-P3 of FIM(X) to obtain logical pages 0-3). All pages are subject to ECC decoding 1532 and any UECC page(s) are identified 1534 (e.g., logical pages 0 and 1 are UECC). XOR data corresponding to the UECC data is identified 1536 and a parallel read and transfer of data of all planes (P0-P3) of FIM(X) 1538 is carried out to obtain the XOR data (e.g., XOR data [0.1], [0,2], [1,3] and [2.4]). All pages of XOR data are subject to ECC decoding 1539 to generate corrected XOR data and identify any XOR data that is UECC. For any page of user data that was found to be UECC, related XOR and user data that are not UECC are identified 1540 (e.g., for logical page 0, XOR data [0,2] and logical page 2 may be identified, while for logical page 1, XOR data [1,3] and logical page 3 may be identified). The corrected related XOR data and user data are then subject to XOR operation 1542 to generate a corrected copy (e.g., generate logical page 0 from XOR data [0,2] and logical page 2 and generate logical page 1 from XOR data [1,3] and logical page 3), which is sent to host 400.

Figure 16:
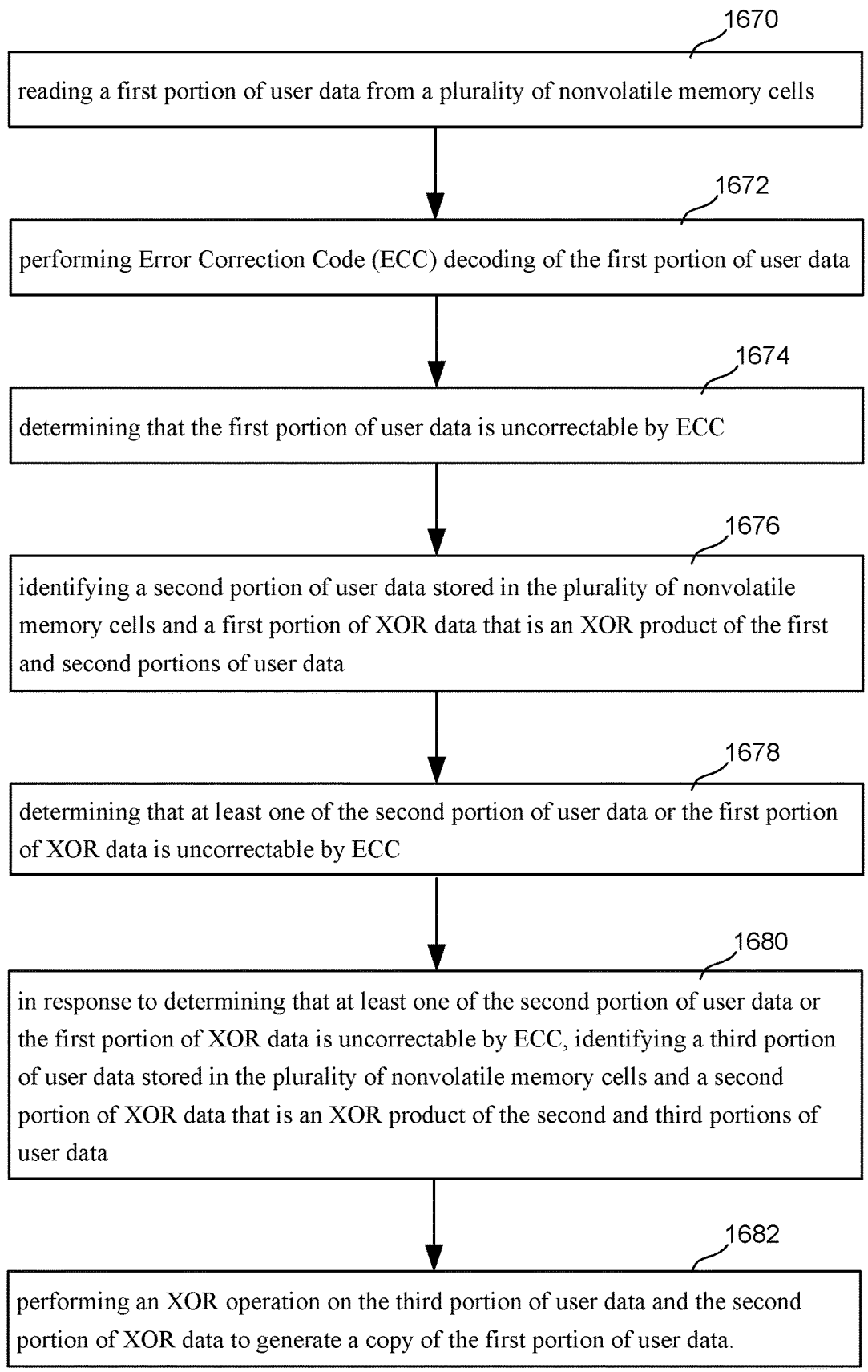
FIG. 16 illustrates a method that includes performing XOR to generate a corrected copy of data using second XOR data.

FIG. 16 shows an example of a method that includes reading a first portion of user data from a plurality of nonvolatile memory cells 1670, performing Error Correction Code (ECC) decoding of the first portion of user data 1672 and determining that the first portion of user data is uncorrectable by ECC 1674 (e.g., page 0 is UECC). The method further includes identifying a second portion of user data stored in the plurality of nonvolatile memory cells and a first portion of XOR data that is an XOR product of the first and second portions of user data 1676 (e.g., identifying XOR data [0,1] and page 1), determining that at least one of the second portion of user data or the first portion of XOR data is uncorrectable by ECC 1678, in response to determining that at least one of the second portion of user data or the first portion of XOR data is uncorrectable by ECC, identifying a third portion of user data stored in the plurality of nonvolatile memory cells and a second portion of XOR data that is an XOR product of the second and third portions of user data 1680 (e.g., identifying XOR data [0,2] and page 2) and performing an XOR operation on the third portion of user data and the second portion of XOR data to generate a copy of the first portion of user data 1682 (e.g., XOR of [0,2] and page 2 to obtain page 0).

FIG. 17 illustrates an example of a method that includes method steps that may be performed before the steps illustrated in FIG. 16 (e.g., during writing of data in a nonvolatile memory in response to a write command). The method includes receiving the first, second and third portions of user data 1790 and performing XOR operations to generate the first XOR data from the first and second portions of user data and to generate the second XOR data from the second and third portions of user data 1792 (e.g., generating XOR data [0,1] and [0,2] from portions 0, 1 and 2). The method further includes writing the first, second and third portions of user data in a first metablock formed of a first subset of the plurality of nonvolatile memory cells 1794 (e.g., as shown in FIG. 13A) and writing the first and second XOR data in a second metablock formed of a second subset of the plurality of nonvolatile memory cells 1796 (e.g., as shown in FIG. 13B).

An example apparatus includes one or more control circuits configured to connect to a plurality of nonvolatile memory cells. The one or more control circuits are configured to, in response to determining that a first portion of user data from the plurality of nonvolatile memory cells that was found to be uncorrectable by ECC is unrecoverable by a first Exclusive OR (XOR) operation using first XOR data and a second portion of user data, recover the first portion of user data by a second XOR operation using second XOR data and a third portion of user data.

The one or more control circuits may be further configured to generate the first and second XOR data when storing the first, second and third portions of user data in the plurality of nonvolatile memory cells. The one or more control circuits may be further configured to perform XOR operations when storing data such that each portion of data stored in the plurality of nonvolatile memory cells is subject to an XOR operation with at least two other portions of user data. The one or more control circuits may be further configured to perform XOR operations on portions of user data assigned to four planes of a Flash Interface Module (FIM) such that each portion of data in a plane is subject to XOR operations with user data from at least two other planes. The one or more control circuits may be configured to generate four pages of XOR data for four pages of user data assigned to the four planes of a FIM. The first portion of data may be written in the plurality of nonvolatile memory cells in Multi Level Cell (MLC) format and the first and second XOR data may be written in the plurality of nonvolatile memory cells in Single Level Cell (SLC) format. The one or more control circuits may be further configured to delete the first and second XOR data after the first portion of data is confirmed as written in MLC format with an acceptable error rate. The one or more control circuits may be located on a memory controller die; the plurality of nonvolatile memory cells may be located on a plurality of memory dies; and the first, second and third portions of user data and the first and second XOR data may be stored in nonvolatile memory cells of the plurality of memory dies. The memory controller die may include a plurality of Flash Interface Modules (FIMs), each FIM connected to a plurality of nonvolatile memory dies and the one or more control circuits are located in a FIM of the plurality of FIMs.

An example of a method includes reading a first portion of user data from a plurality of nonvolatile memory cells; performing Error Correction Code (ECC) decoding of the first portion of user data; determining that the first portion of user data is uncorrectable by ECC; identifying a second portion of user data stored in the plurality of nonvolatile memory cells and a first portion of XOR data that is an XOR product of the first and second portions of user data; determining that at least one of the second portion of user data or the first portion of XOR data is uncorrectable by ECC; in response to determining that at least one of the second portion of user data or the first portion of XOR data is uncorrectable by ECC, identifying a third portion of user data stored in the plurality of nonvolatile memory cells and a second portion of XOR data that is an XOR product of the second and third portions of user data; and performing an XOR operation on the third portion of user data and the second portion of XOR data to generate a copy of the first portion of user data.

Reading the first portion of user data may include reading nonvolatile memory cells that are configured as Tri Level Cell (TLC) memory cells to store the first portion of user data; and the second and third portions of data and the first and second portions of XOR data may be stored in nonvolatile memory cells that are configured as Single Level Cell (SLC) memory cells. The TLC memory cells may be located in a user data block coupled to a Flash Interface Module (FIM) and the SLC memory cells may be in an XOR block connected to the FIM. The method may further include storing the copy of the first portion of user data in the TLC memory cells; and verifying that the copy of the first portion of user data in the TLC memory cells has an error rate below a threshold error rate. The method may further include subsequently, in response to verifying that the copy of the first portion of user data in the TLC memory cells has an error rate below the threshold error rate, erasing the second and third portions of data and the first and second portions of XOR data from the SLC memory cells. The method may further include subsequently sending the copy of the first portion of user data to a host in response to a host read command directed to the first portion of data. The method may further include prior to reading the first portion of user data from the plurality of nonvolatile memory cells: receiving the first, second and third portions of user data; and performing XOR operations to generate the first XOR data from the first and second portions of user data and to generate the second XOR data from the second and third portions of user data. The method may further include writing the first, second and third portions of user data in a first metablock formed of a first subset of the plurality of nonvolatile memory cells; and writing the first and second XOR data in a second metablock formed of a second subset of the plurality of nonvolatile memory cells.

An example of a data storage system includes a plurality of nonvolatile memory cells; and means for performing XOR operations on portions of data to be stored in the plurality of nonvolatile memory cells such that each portion of user data is XORed with at least two other portions of user data to generate at least two portions of XOR data to provide at least two ways to generate a portion of user data from XOR data and other user data.

The plurality of nonvolatile memory cells may be located on a memory die and the means for performing XOR operations may be located on a controller die. The plurality of nonvolatile memory cells may be NAND flash memory cells that are configurable for operation as Single Level Cell (SLC) or Multi Level Cell (MLC) cells, all portions of user data may be initially stored in nonvolatile memory cells configured as SLC cells and subsequently copied to nonvolatile memory cells configured as MLC cells and the at least two portions of XOR data may be stored in nonvolatile memory cells configured as SLC cells.

The foregoing detailed description has been presented for purposes of illustration and description. It is not intended to be exhaustive or to limit the invention to the precise form disclosed. Many modifications and variations are possible in light of the above teachings. The described embodiments were chosen in order to best explain the principles of the technology and its practical application, to thereby enable others skilled in the art to best utilize the technology in various embodiments and with various modifications as are suited to the particular use contemplated. It is intended that the scope of the technology be defined by the claims appended hereto.

What is claimed is:

1. An apparatus comprising:
one or more control circuits configured to connect to a plurality of nonvolatile memory cells,
the one or more control circuits are configured to:
perform Error Correction Code (ECC) encoding of a plurality of portions of data to be stored in the plurality of memory cells and perform Exclusive OR (XOR) operations on the plurality of portions such that each portion is subject to at least two separate XOR operations that generate different XOR data and in response to determining that a first portion of user data from the plurality of nonvolatile memory cells that was found to be uncorrectable by ECC is unrecoverable by a first XOR operation using first XOR data and a second portion of user data, recover the first portion of user data by a second XOR operation using second XOR data that is different to the first XOR data and a third portion of user data that is different to the second portion of user data.

2. The apparatus of claim 1, wherein the one or more control circuits are further configured to generate the first and second XOR data when storing the first, second and third portions of user data in the plurality of nonvolatile memory cells.

3. The apparatus of claim 1, wherein the one or more control circuits are further configured to perform XOR operations on portions of user data assigned to four planes of a Flash Interface Module (FIM) such that each portion of data in a plane is subject to XOR operations with user data from at least two other planes.

4. The apparatus of claim 3, wherein the one or more control circuits are configured to generate four pages of XOR data for four pages of user data assigned to the four planes of a FIM.

5. The apparatus of claim 1, wherein the first portion of data is written in the plurality of nonvolatile memory cells in Multi Level Cell (MLC) format and the first and second XOR data are written in the plurality of nonvolatile memory cells in Single Level Cell (SLC) format.

6. The apparatus of claim 5, wherein the one or more control circuits are further configured to delete the first and second XOR data after the first portion of data is confirmed as written in MLC format with an acceptable error rate.

7. The apparatus of claim 1, wherein:
the one or more control circuits are located on a memory controller die;
the plurality of nonvolatile memory cells are located on a plurality of memory dies; and
the first, second and third portions of user data and the first and second XOR data are stored in nonvolatile memory cells of the plurality of memory dies.

8. The apparatus of claim 7, wherein the memory controller die includes a plurality of Flash Interface Modules (FIMs), each FIM connected to a plurality of nonvolatile memory dies and the one or more control circuits are located in a FIM of the plurality of FIMs.

9. A method comprising:
performing Error Correction Code (ECC) encoding of a plurality of portions of data to be stored in the plurality of memory cells;

performing first Exclusive OR (XOR) operations on the plurality of portions of data such that each portion is XORed with at least one other portion to generate first XOR data;

performing second XOR operations on the plurality of portions of data such that each portion is additionally XORed with a different at least one other portion to generate second XOR data that is different to the first XOR data;

reading a first portion of user data from a plurality of nonvolatile memory cells;

performing ECC decoding of the first portion of user data;

determining that the first portion of user data is uncorrectable by ECC;

identifying a second portion of user data stored in the plurality of nonvolatile memory cells and a first portion of XOR data that is an XOR product of the first and second portions of user data;

determining that at least one of the second portion of user data or the first portion of XOR data is uncorrectable by ECC;

in response to determining that at least one of the second portion of user data or the first portion of XOR data is uncorrectable by ECC, identifying a third portion of user data that is different to the second portion of user data and is stored in the plurality of nonvolatile memory cells and a second portion of XOR data that is an XOR product of the second and third portions of user data, the second portion of XOR data is different to the first portion of XOR data; and performing an XOR operation on the third portion of user data and the second portion of XOR data to generate a copy of the first portion of user data.

10. The method of claim 9, wherein:

reading the first portion of user data includes reading nonvolatile memory cells that are configured as Tri Level Cell (TLC) memory cells to store the first portion of user data; and the second and third portions of data and the first and second portions of XOR data are stored in nonvolatile memory cells that are configured as Single Level Cell (SLC) memory cells.

11. The method of claim 10, wherein the TLC memory cells are located in a user data block coupled to a Flash Interface Module (FIM) and the SLC memory cells are in an XOR block connected to the FIM.

12. The method of claim 10, further comprising:

storing the copy of the first portion of user data in the TLC memory cells; and verifying that the copy of the first portion of user data in the TLC memory cells has an error rate below a threshold error rate.

13. The method of claim 12, further comprising:

subsequently, in response to verifying that the copy of the first portion of user data in the TLC memory cells has an error rate below the threshold error rate, erasing the second and third portions of data and the first and second portions of XOR data from the SLC memory cells.

14. The method of claim 9, further comprising:

subsequently sending the copy of the first portion of user data to a host in response to a host read command directed to the first portion of data.

15. The method of claim 9, further comprising, prior to reading the first portion of user data from the plurality of nonvolatile memory cells:

receiving the first, second and third portions of user data; and performing XOR operations to generate the first XOR data from the first and second portions of user data and to generate the second XOR data from the second and third portions of user data.

16. The method of claim 15, further comprising:

writing the first, second and third portions of user data in a first metablock formed of a first subset of the plurality of nonvolatile memory cells; and writing the first and second XOR data in a second metablock formed of a second subset of the plurality of nonvolatile memory cells.

17. A data storage system comprising:

a plurality of nonvolatile memory cells; and means for performing XOR operations on portions of data to be stored in the plurality of nonvolatile memory cells such that each portion of user data is XORed with at least a first portion of user data to generate first XOR data and with a second portion of user data that is different to the first portion of user data to generate second XOR data that is different to the first XOR data to provide at least two ways to generate a portion of user data from XOR data and other user data such that a portion of data that is uncorrectable by ECC and by a first XOR operation using the first portion of user data with the first XOR data is recoverable by a second XOR operation using the second portion of user data with the second XOR data.

18. The data storage system of claim 17, wherein the plurality of nonvolatile memory cells are located on a memory die and the means for performing XOR operations are located on a controller die.

19. The data storage system of claim 17, wherein the plurality of nonvolatile memory cells are NAND flash memory cells that are configurable for operation as Single Level Cell (SLC) or Multi Level Cell (MLC) cells, all portions of user data are initially stored in nonvolatile memory cells configured as SLC cells and subsequently copied to nonvolatile memory cells configured as MLC cells and the at least two portions of XOR data are stored in nonvolatile memory cells configured as SLC cells.

* * * * *